United States Patent [19]

Altenburger

[11] 4,017,691
[45] Apr. 12, 1977

[54] NUMBER TRANSLATOR
[75] Inventor: Otto Altenburger, Rochester, N.Y.
[73] Assignee: Stromberg-Carlson Corporation, Rochester, N.Y.
[22] Filed: Dec. 10, 1975
[21] Appl. No.: 639,308
[52] U.S. Cl. .................... 179/18 ET; 179/18 ES
[51] Int. Cl.² .................................... H04Q 3/47
[58] Field of Search ........ 179/18 ET, 18 EB, 18 ES

[56] References Cited
UNITED STATES PATENTS

| | | | |
|---|---|---|---|
| 3,536,846 | 10/1970 | Reines et al. .................. | 179/18 ET |
| 3,560,661 | 2/1971 | Kobus et al. .................. | 179/18 ET |
| 3,666,891 | 5/1972 | LeBellec ....................... | 179/18 ET |
| 3,911,227 | 10/1975 | Lawrence ...................... | 179/18 ET |

Primary Examiner—Douglas W. Olms
Attorney, Agent, or Firm—Donald R. Antonelli; William F. Porter, Jr.

[57] ABSTRACT

A number translator which includes a memory system for storing directory and equipment numbers as well as other subscriber data has a digit store for storing data received from a register prior to its being passed on to the memory system, a register sender control for controlling the sending of data from the memory system to the register and a translator control for controlling both the digit storage and the sender control. The number translator further includes a route translation circuit by which an available outgoing trunk group is selected and an outgoing trunk marker control for controlling trunk selection based on sender availability. Various decoding is also performed in the translator including both calling and called class-of-service decoding as well as office codes and party line identification.

12 Claims, 26 Drawing Figures

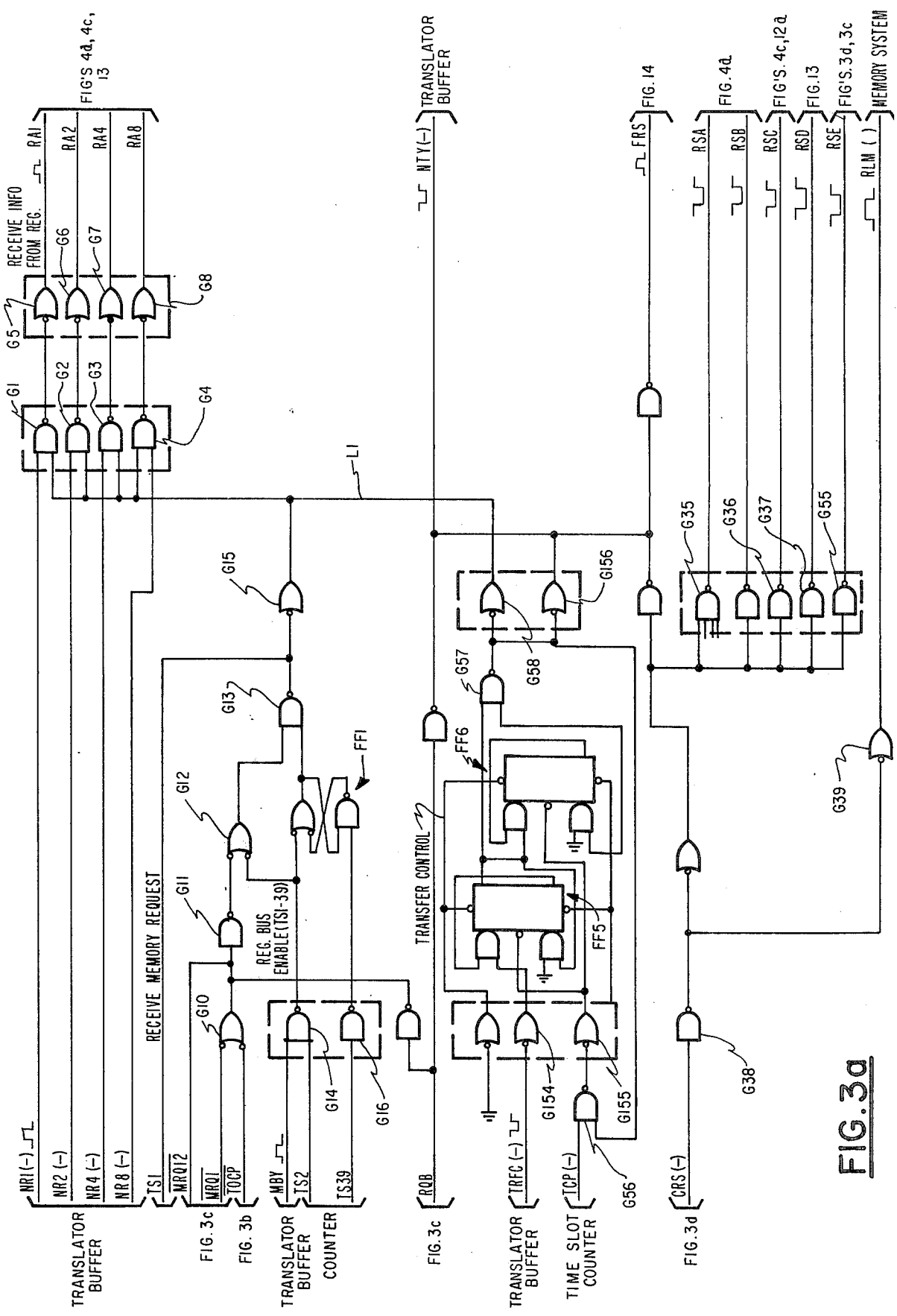

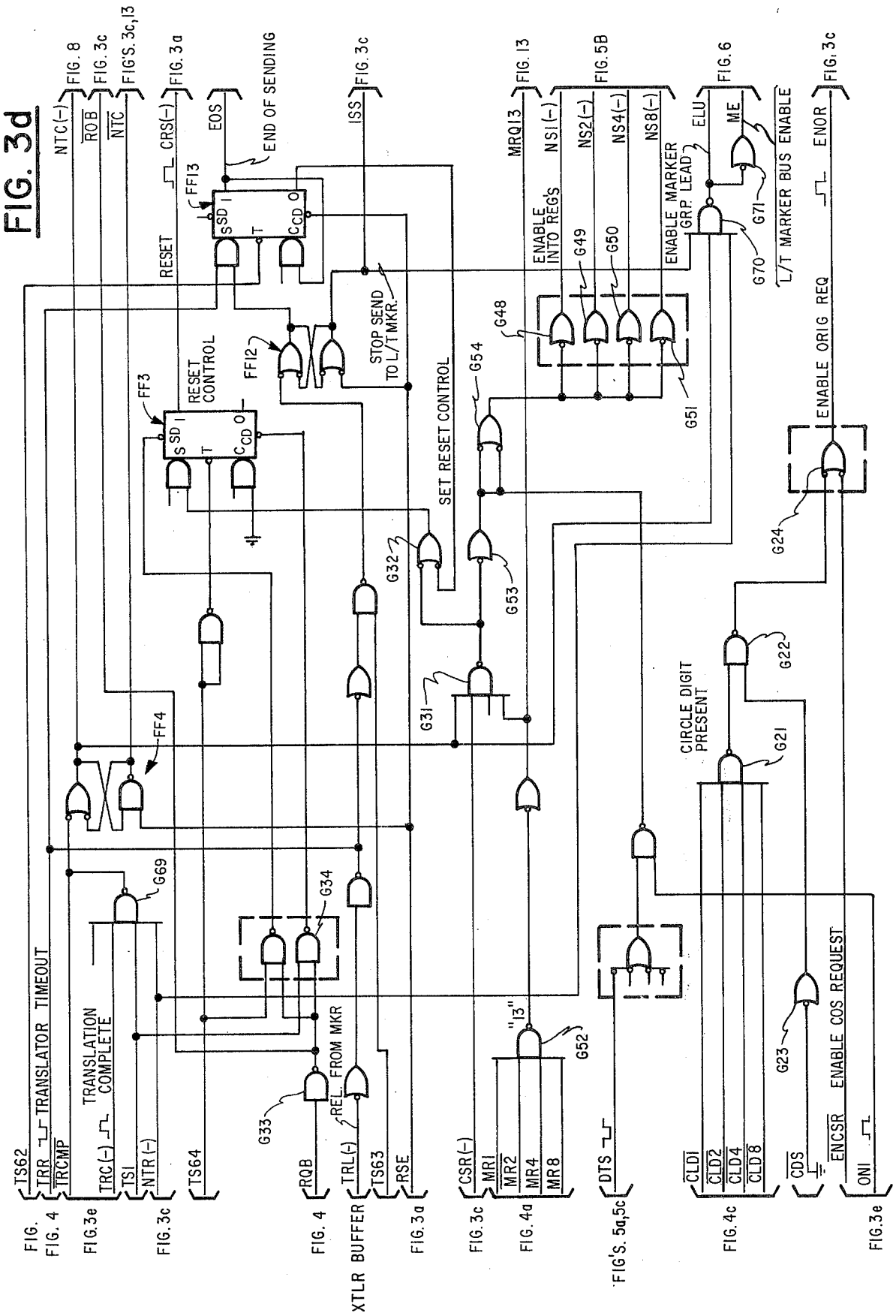

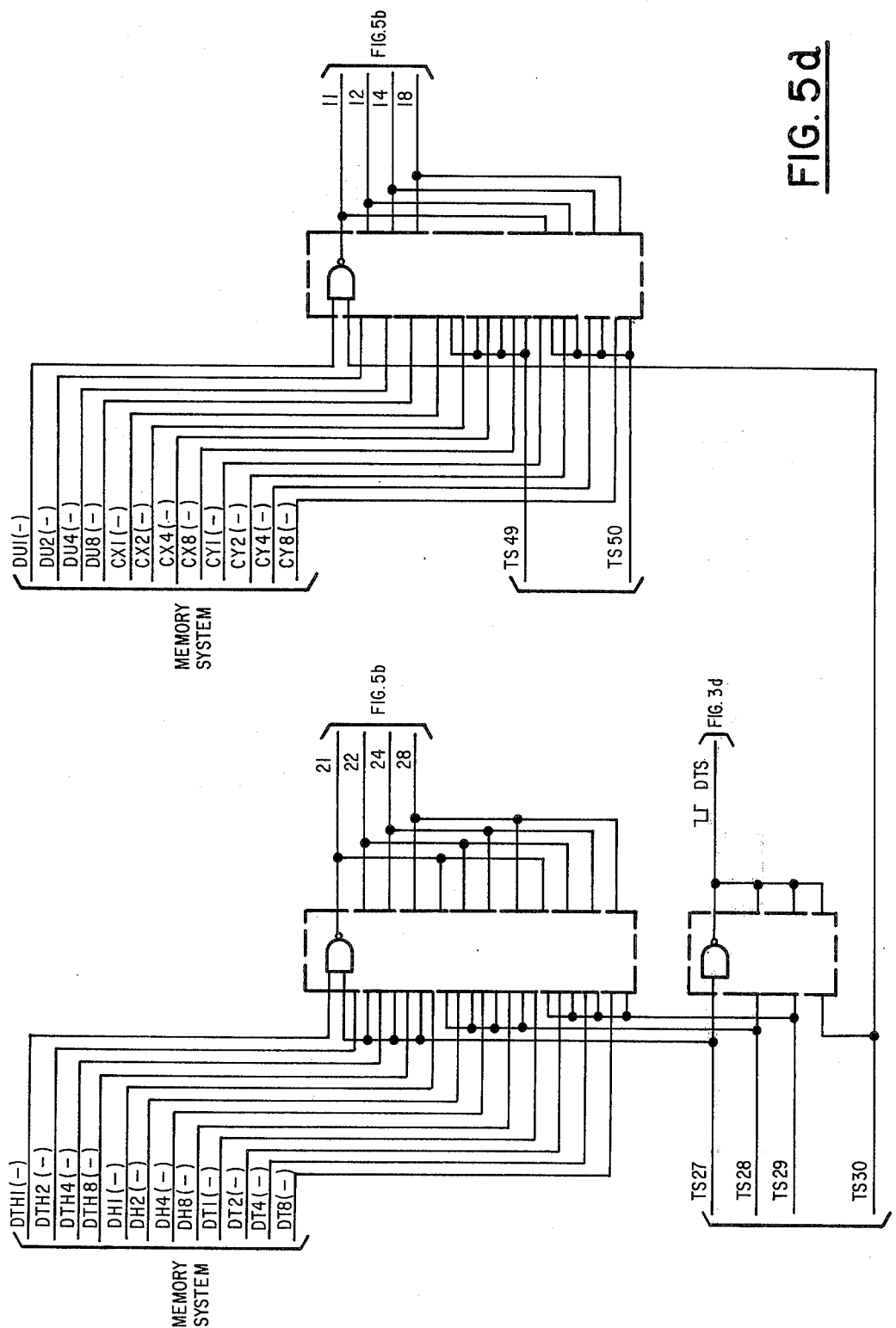

NUMBER TRANSLATOR

The present invention relates in general to telephone systems, and more particularly to improvements in a number translator for an electronic common control telephone system.

The basic purpose of the number translator is to convert line equipment number and party identification into directory number and class of service for local originating calls and to convert directory number into line equipment number, ringing code, and called class of service in connection with local terminating traffic. However, the number translator in a typical common control system has been called upon to perform increasingly more duties indirectly related to the basic number translation which is its basic purpose. As a result, such circuits have grown in complexity to the point where they resemble mini computers, and are sometimes operated on the basis of stored programs.

In accordance with the present invention, a number translator control circuit is provided which controls the transfer of data to and from the memory system in the translater as well as performing the other functions required of the number translator. But, in addition to converting the line equipment number and party identification into directory number and class of service on local originating calls, and converting directory number into line equipment number, ringing code and called class of service for local terminating traffic, the translator in accordance with the present invention also provides routing to trunk groups in connection with reverting call, direct inward dialing, operator intercept and other miscellaneous functions by use of the outgoing trunk marker.

In addition, the present invention performs various functions in connection with a PBX directory number. The translator supplies the first line equipment number of the PBX group in the standard fashion, and if the line is busy, the translator then supplies the next line equipment number from its memory. This process continues until an idle line is found, or the last line of the PBX group is reached.

One of the basic features of the present invention is the provision in the number translator control of a digit storage in which all data received from the register is stored prior to being transferred to the memory system for comparison with the data stored therein. In this way, various operations, including decoding, can be performed in connection with the data so received from the register, and this data can also be used to initiate various functions which need to be performed by the translator.

The number translator is also associated with a number translator program control which serves to provide access to the data stored in the memory system, making it possible to monitor or alter this data in the memory system. Access to the memory system is provided in a number of ways, including magnetic tape and teletype transfer.

It is a general object of the present invention to provide a new and improved number translator for common control telephone systems.

It is a further object of the present invention to provide a number translator of simplified construction which is capable of performing all of the functions required which relate to number translation.

It is still another object of the present invention to provide a number translator having a control system which includes data storage to facilitate the transfer of data and control over the various functions to be performed by the translator.

These and other objects, features, and advantages of the present invention will become more apparent from the following detailed description thereof when taken in conjunction with the accompanying drawings, which illustrate one specific embodiment of the present invention, and wherein:

FIGS. 3a through 3e are schematic circuit diagrams of the translator control circuit;

FIGS. 5a through 5c are schematic circuit diagrams of the register sender control;

Figure 12A:
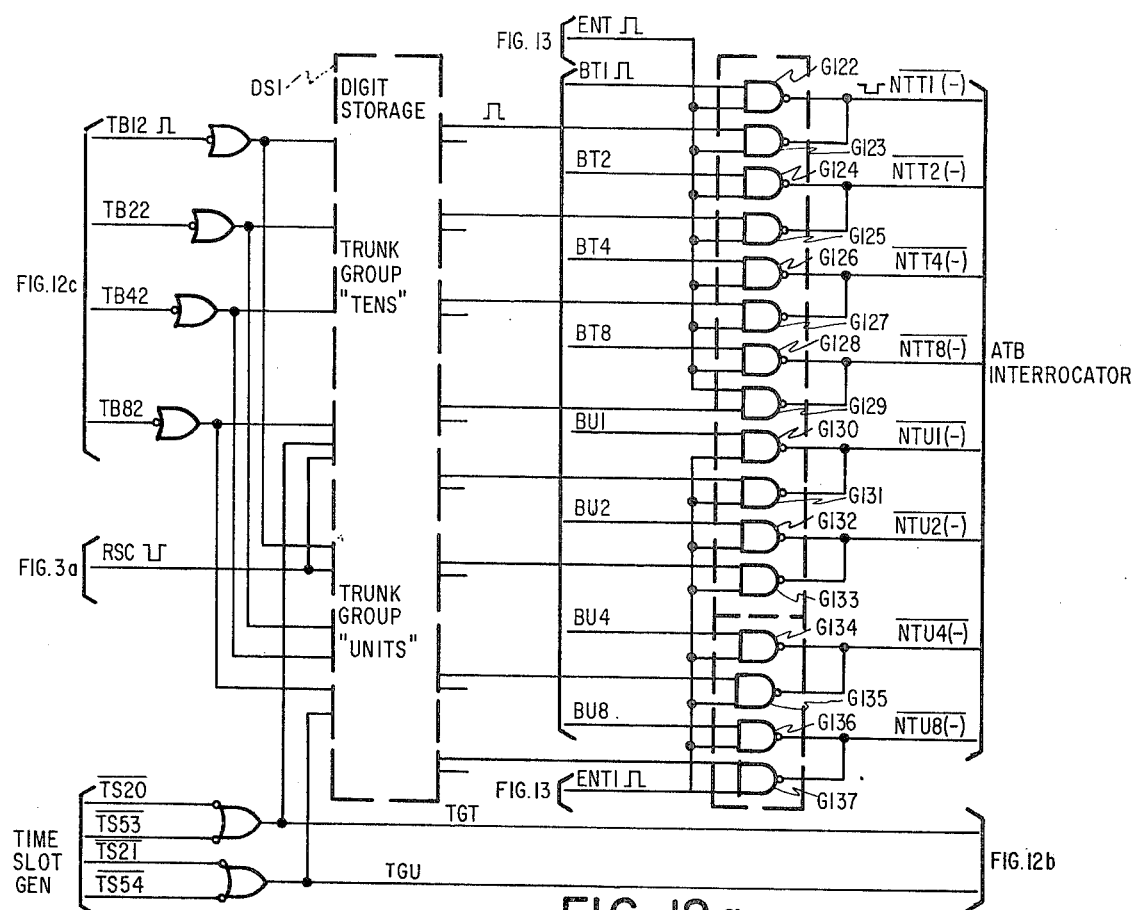
Figure 12C:
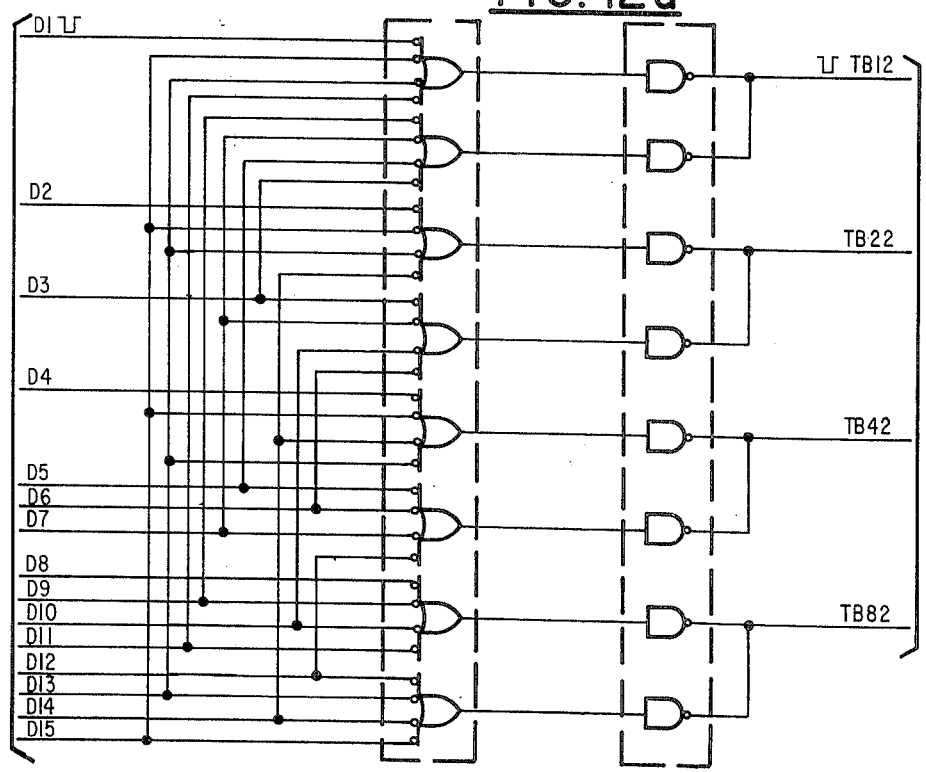
Figure 12B:
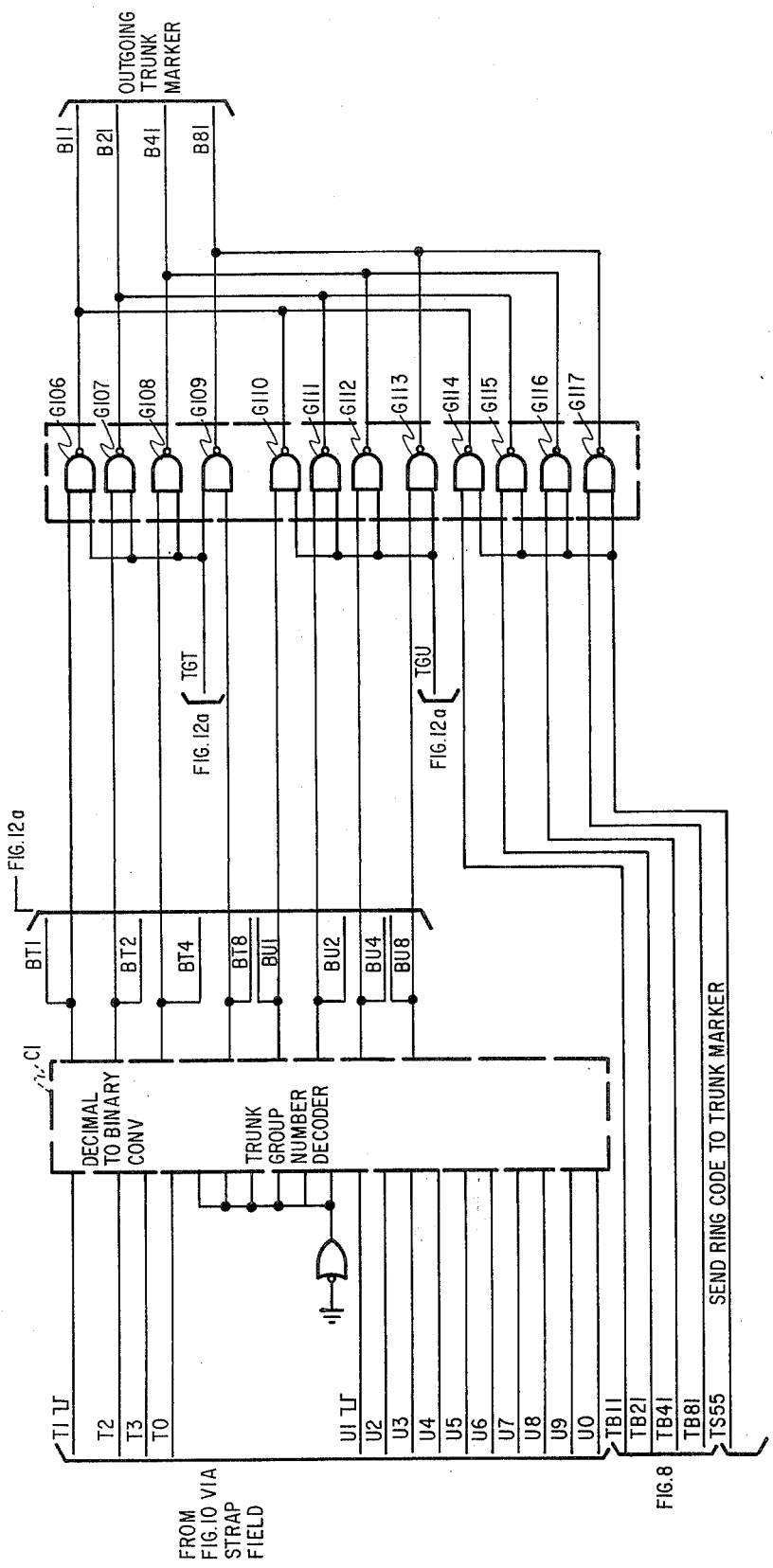
Figure 13:
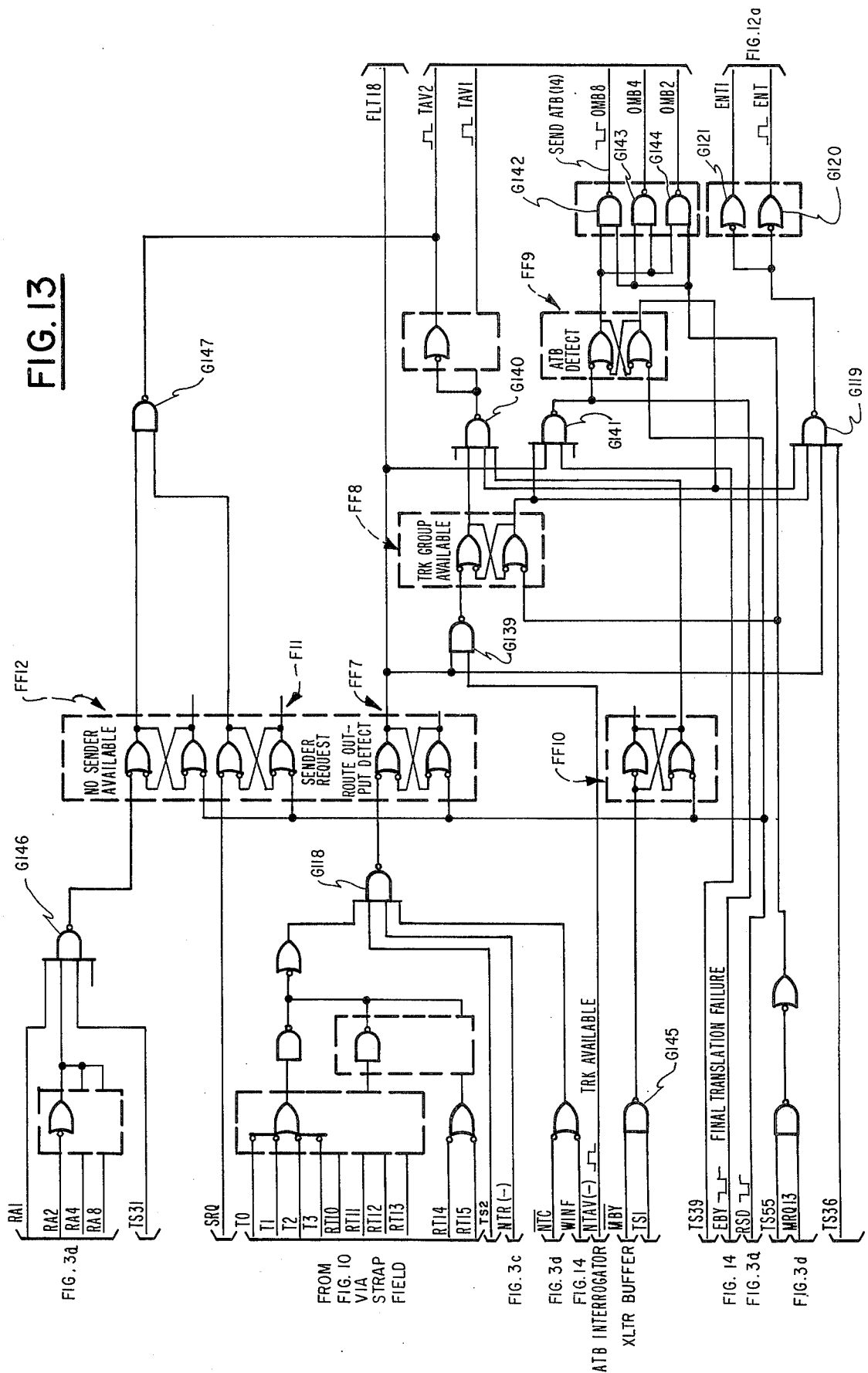
Figure 14:
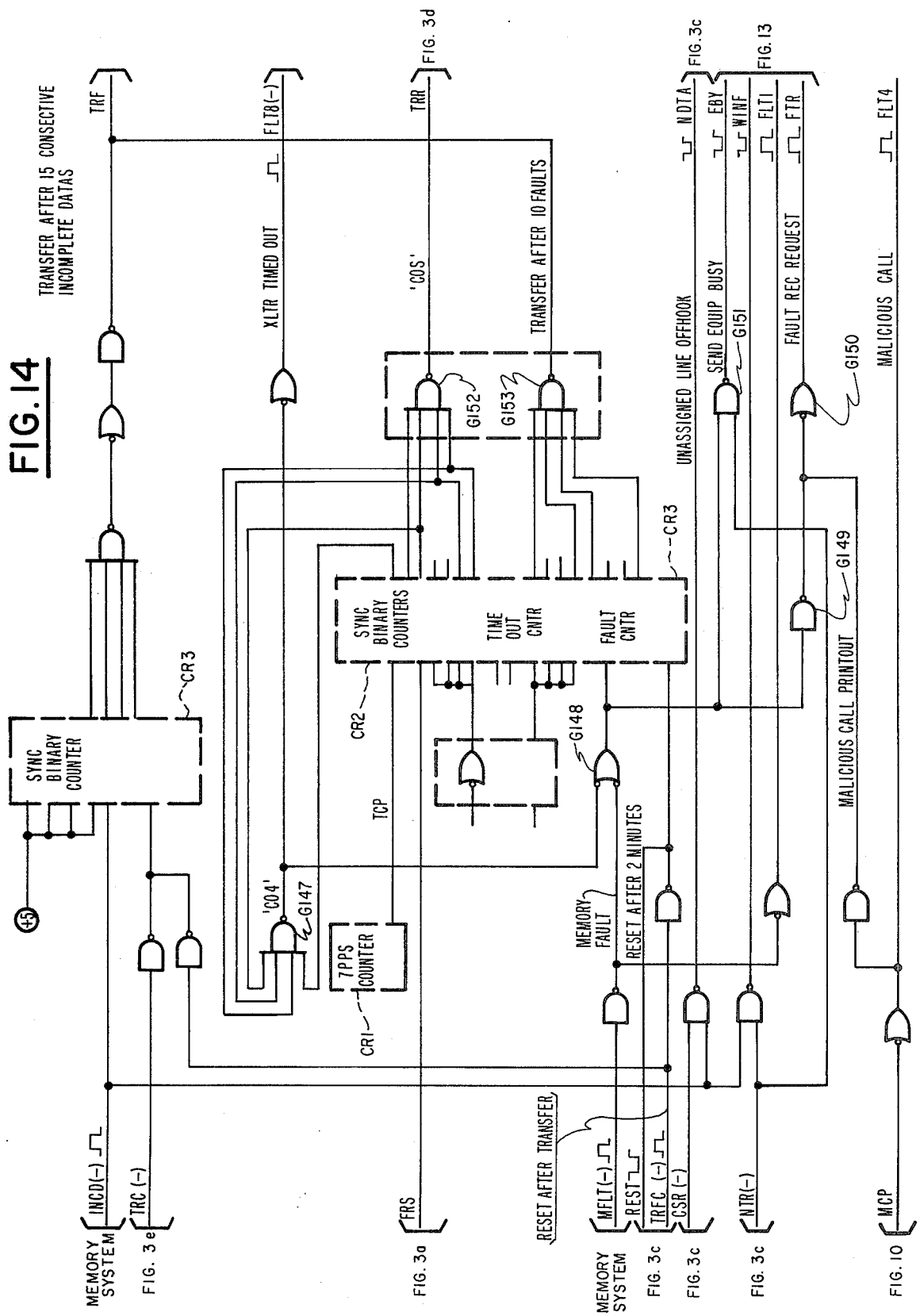

FIGS. 12a, 12b, and 12c are schematic circuit diagrams of the route translation circuit;

FIG. 13 is a schematic circuit diagram of the outgoing trunk marker control; and FIG. 14 is a schematic circuit diagram of the time-out and fault-control circuit.

GENERAL SYSTEM DESCRIPTION

Figure 1A:
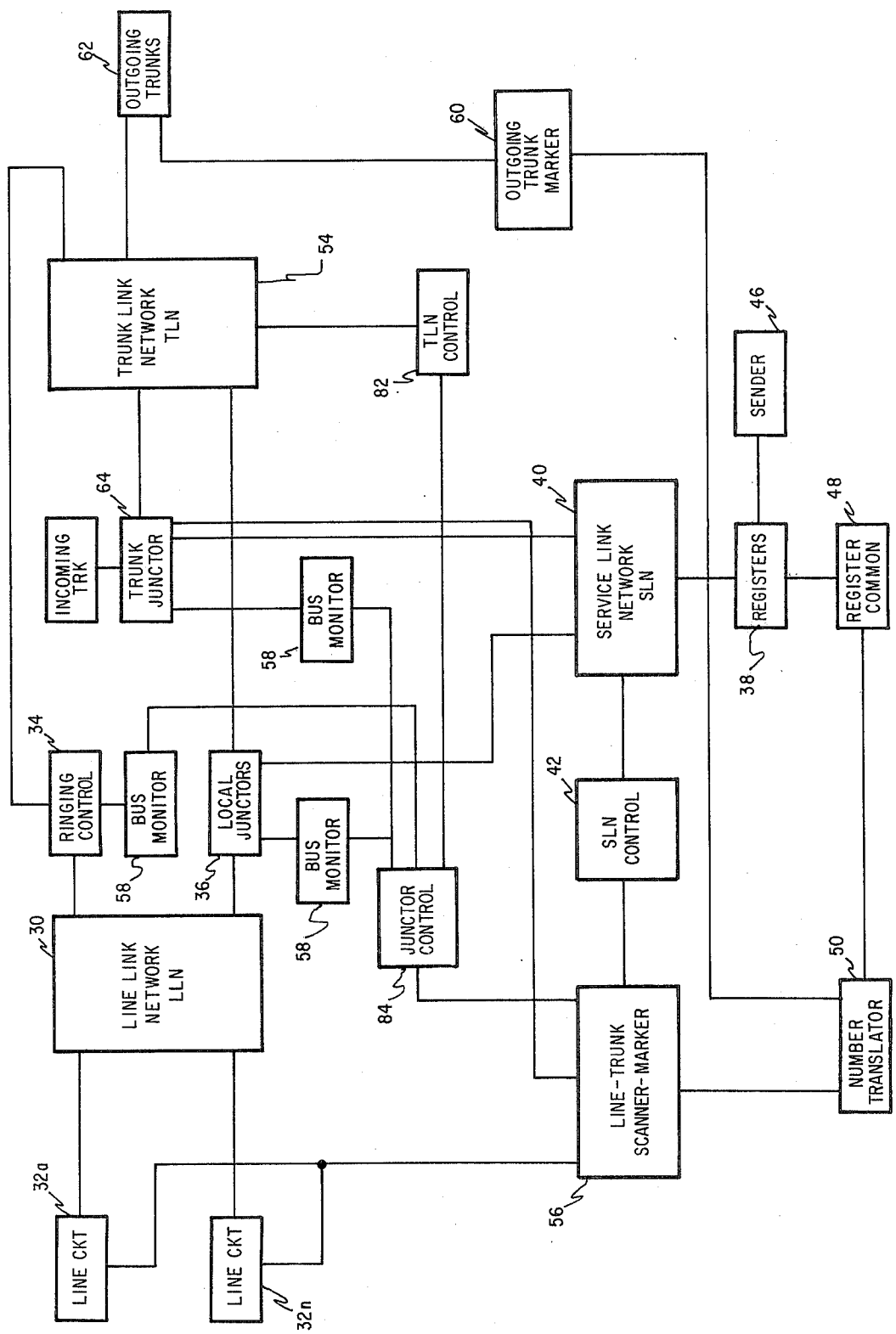
FIG. 1a is a basic block diagram of a telephone system including the number translator of the present invention.
Figure 1B:
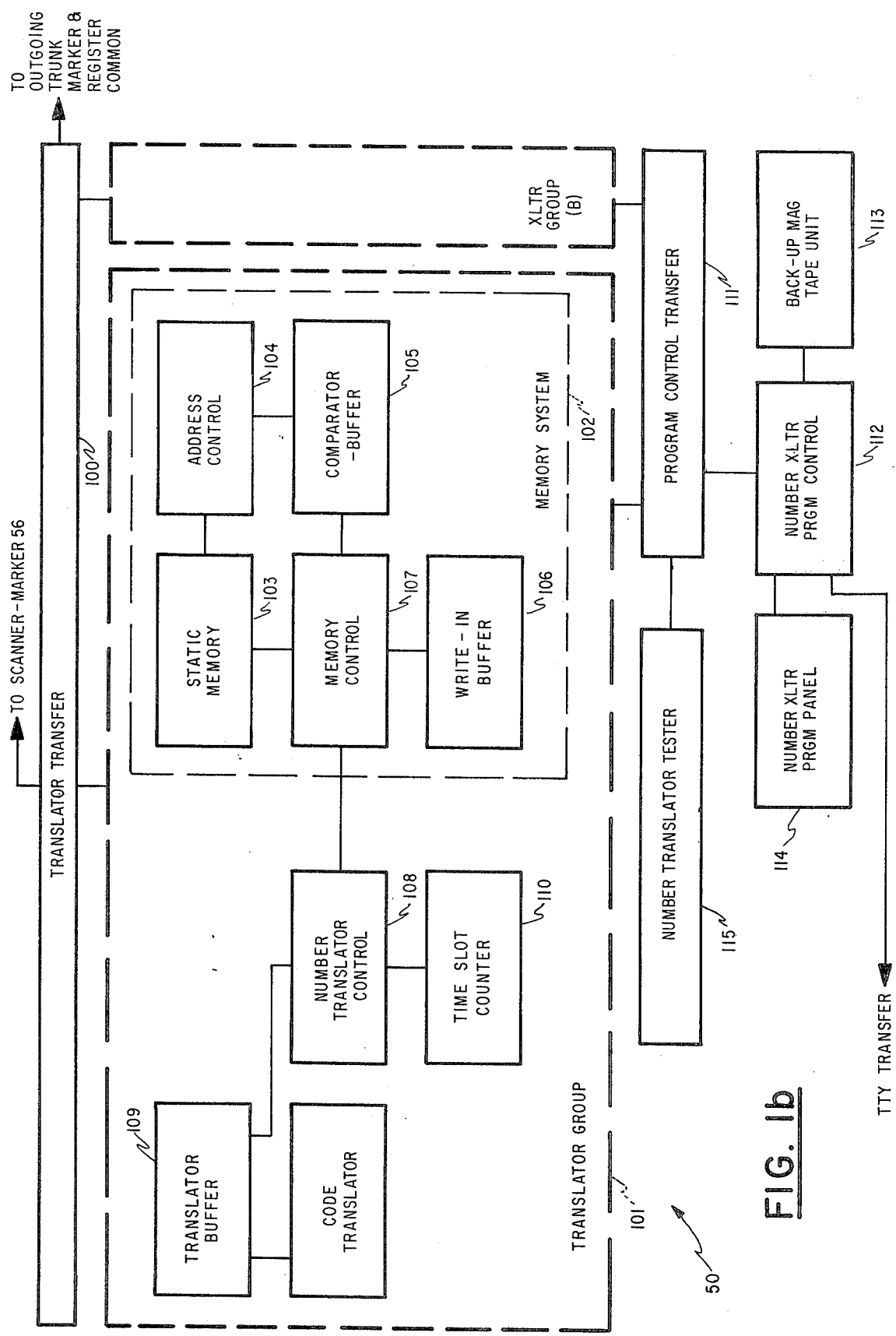
FIG. 1b is a more detailed block diagram of the number translator of the present invention.

FIG. 1a of the drawing illustrates a basic block diagram of a telephone system including a plurality of line circuits 32a through 32n connected to a multistage line link network (LLN) 30, the final stage of which provides terminations to the local junctors 36 in the case of originating traffic and to the ringing controls 34 for terminating traffice. The number of local junctors and ringing controls provided depends upon the traffic requirements for the system.

The local junctors 36, which may be of the type disclosed in the U.S. Pat. No. 3,705,268 to Otto Altenburger, include provisions for connecting the line circuits to local registers 38 through a service link network 40 under the control of a service link network control 42. The registers 38, which serve to detect dialing information and other subscriber signals from the line circuits, basically consist of a dial pulse acceptor, register storage, and register output and can be connected to a sender 46 for providing outpulsing in connection with outgoing trunk calls. The registers 38 and senders 46 are involved with outgoing trunk calls. The registers 38 and senders 46 are controlled by a register common 48, which is in turn connected to the number-code translator 50 in accordance with the present invention, providing information concerning equipment numbers, ringing codes, and class of service information as well as other functions in a manner to be described in detail herein.

The line-trunk scanner-marker 56 serves to simultaneously scan the line circuits and incoming trunk circuits in groups to detect requests for service, and is used for both originating and terminating types of functions. When the circuit 56, which continuously scans the line circuits 32a through 32n and the trunk junctors 64 detects a service request in the form of an off-hook condition, it marks the line or trunk requesting service and actuates the service link network control 42 to start the path finding from an available register 38 to the marked line circuit or trunk.

In the case of locally generated calls, the service link network control 42 seeks out a path from the register 38 through the service link network 40, a local junctor 36, and the line link network 30 to the marked line circuit. Dial tone is then applied to the line circuit from the register 38, notifying the subscriber that he may commence dialing the line number of the called party.

The dialed information is received from the calling subscriber line in the register 38, which determines from the translator 50 whether the call is to be a local call or a trunk call. In the case of a local call, the number of the called party is translated to an equipment number in the translator 50 and the circuit 56 marks the called line in accordance with the equipment number received from the translator 50. At this time, a switch-through signal is forwarded from the local register 38 through the local junctor 36 signalling the junctor to seize the junctor control 84 to effect termination of the call to the marked called link circuit.

In the case of an incoming trunk call, the incoming trunk is connected through the trunk junctor 64 and service link network 40 to the register, which then receives the dialed information which is outpulsed from the distant central office.

In terminating a call within the system, the junctor control 84 actuates the trunk link network control 82 to start the path finding operation through the trunk link network 54 from the local junctor 36 or trunk junctor 64 to the marked terminating line circuit. The ringing code for the called subscriber is forwarded from the translator 50 and the junctor control 84 to the ringing control 34. As soon as the junctor control 84 determines that the connection from the junctor 36 through the trunk link network 54, ringing control 34 and line link network 30 to the line circuit has been completed, it will signal the local junctor or trunk junctor preparing the junctor for switch-through between the parties upon receipt of answer supervision, and the junctor will then release the junctor control in response to this signal.

The termination of a trunk call is similar to the termination of a local call, with the exception that an outgoing trunk 62 (operator trunk, etc.) is seized rather than a terminating line circuit. When it is determined that the call will be a trunk call, the outgoing trunk marker 60 is seized and the equipment number designating the trunk group is forwarded from the number translator 50 to effect a marking of the trunk group. The outgoing trunk marker 60 then seizes the junctor control 84 and the switch-through signal is forwarded from the local register 38 through the local junctor 36 to the junctor control initiating operation of the TLN control 82 to perform path finding through the trunk link network 54 from the local junctor 36 to the marked outgoing trunk 78.

GENERAL DESCRIPTION OF THE NUMBER TRANSLATOR

The heart of the number translator is the memory system 102 which serves to store directory numbers, equipment numbers, class of service information, ringing codes, and other data required by the telephone system. Such memory systems are well known in the art and have been provided in numerous forms in telephone systems. Storage in the memory system is provided by a static random access memory 103 which is an electrically alterable memory array capable of storing information in binary form and providing this information during retrieval in a nondestructive way. Typically, such static memories are formed by a plurality of basic MOS static memory chips formed into an array so that column selection and row selection can be performed to obtain access to the data stored therein. Address control is performed by the circuit 104 which is capable of generating sequential addresses on respective binary address leads to select one of the numerous storage locations in the electrically alterable memory 103. Such scanning of the memory is provided under control of the memory control 107. The memory control 107 also serves to transfer data from the register which is received via the translator buffer 109 and the number translator control 108 to a comparator buffer 105 where the particular number may then be compared with the sequentially addressed numbers stored in the static memory 103 under control of the address control 104. The various functions that are performed by the number translator control 108 in accordance with the present invention are performed at various times in accordance with selective time slots supplied to the number translator control 108 from the time slot counter 110.

The data which is stored in the memory system 102 may be monitored to determine whether or not correct data is stored in the memory, or the data in the static memory 103 may be altered to update this information and correct any errors which may have occurred in the storage of the data. The system provides a number translator program panel 114 which provides a means of communication between the electrically alterable memory 103 and the number translator program control 112. This circuit provides the capability of monitoring the number translator program control 112, the electrically alterable memory 103, and a number translator tester 150. By means of a teletype connected to the number translator program control 112, operating through the program control transfer 111, the data in selective memory storage locations in the static memory 103 may be sampled and displayed through the number translator program panel 114 and new data may be inserted into the static memory 103 from the number translator program control 112. In addition, a backup magnetic tape unit 113 is provided in case of loss of data in the memory to read new data into the memory, this being accomplished through the number translator program control 112 and program control transfer 111.

Since the memory system 102 may consist of a standard memory arrangement of the type normally provided in association with number translators, the details of the respective elements thereof have not been described in detail herein. The following detailed description of the number translator control forming the basic feature of the present invention will also clearly indicate that standard memory systems of known type may be used to operate with the system of the present invention.

GENERAL DESCRIPTION OF THE NUMBER TRANSLATOR CONTROL

Figure 2:
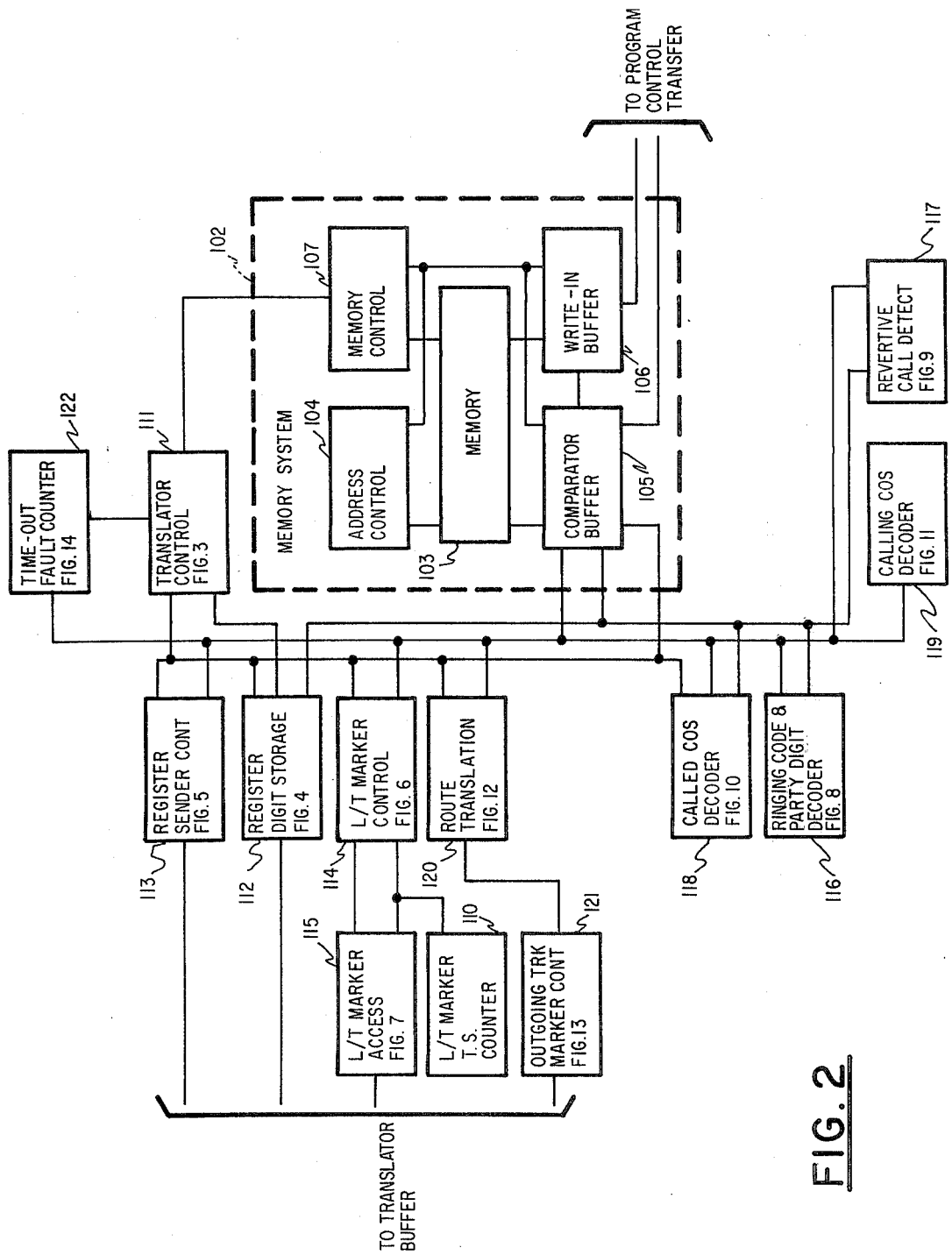
FIG. 2 is a basic block diagram of the number translator control circit.

FIG. 2 is a block diagram of the number translator control, which forms the control interface between the memory systems 102 and the register and other common equipment via the transfer buffer. The number translator control includes a register digit storage 112 which stores the data received from the register prior to its being transferred to the memory system 102 under the control of the translator control 111. The data stored in the register digit storage 112 also serves to control various functions performed within the number translator control, as will be described in greater detail hereinafter.

The register sender control 113 receives data from the memory system 102 via the translator control 111 and transfers this data to the register at various times controlled by the time slot signals produced by the counter 110. Data from the memory system 102 is also supplied through the translator control 111 to the line/trunk marker control 114 and line/trunk marker access 115 where it is transferred directly to the marker scanner 56. This includes data required for marking called line circuits as well as ringing.

Special routing and trunk selection are also performed in the number translator controlled by the route translation circuit 120 and outgoing trunk marker control 121. Using the class of service digits for the calling and called line circuits, special trunk selection is provided in these circuits. In addition, the availability of trunks in the various trunk groups is determined through the number translator control by the route translation circuit 120 and outgoing trunk marker control 121.

The number translator control also performs certain decoding functions, including the decoding of called class of service and calling class of service performed by the decoder circuits 118 and 119. Also ringing code and party digit decoding is performed by the decoder circuit 116 and revertive call detection is performed by the circuit 117.

Malfunctions within the translator are monitored by the timeout and fault counter circuit 122 providing for release of the translator and printing and recording of the faults including problems originating in the system.

Thus, the basic operation of the number translator control consists in storing the data received from the register in the register digit storage 112 prior to its being transferred to the comparator buffer 105 in the memory system 102 under the control of the translator control 111, after which, the memory system is scanned to determine the information from the memory associated with the number stored in the comparator buffer 105 under the control of the memory control 107. Once the requested data has been obtained by the memory system 102, it is transferred through the translator control 111 to the register sender control 113 for transmission to the register and through the circuits 114 and 115 for application directly to the marker and other common circuits within the telephone system. Route translation and selection are also provided by the circuits 120 and 121 based on information decoded by the decoders 118 and 119, and ringing code and party digit information decoded by the circuit 116 is also forwarded to the ringing control and junctor control in the system.

The various features and advantages of the present invention will become more apparent from the following detailed description of the various circuits embodied in the number translator control.

All information sent to and received from the number translator is time-slot controlled. In the example disclosed herein, 64 time slots control the timing of the various functions to be performed. The time slot signals TTS—, as well as other timing signals such as the marker time slot signals MT—, are generated by conventional counter circuits in the well-known manner. Accordingly, such timing cicuits are not disclosed in detail herein.

One of the basic functions of the number translator is to convert the line equipment number and party digit of the calling station, which is received from the register, to the station directory number and class of service on originating calls. Such information is generally received from the line scanner, which initially detects the off-hook condition of the calling station and provides the line identification (equipment number) through the marker to the register.

EQUIPMENT NUMBER TO DIRECTORY NUMBER TRANSLATION

Data which is supplied from the register is applied through the translator buffer through lines NR1, NR2, NR4, and NR8 in the translator control, as seen in FIG. 3a. The data supplied on these lines is time-slot controlled by the common control, which provides the basic time slots for controlling the operating of all of the common equipment in the system, including the number translator. These data leads NR1 through NR8 are applied to respective AND gates G1, G2, G3, and G4, which are controlled from the line L1 to apply the data from the register through gates G5, G6, G7, and G8, respectively, to the digit storage (FIG. 4) on leads RA1, RA2, RA4, and RA8, where the information received from the register is stored prior to its being transferred to the memory system for a time necessary to complete the various operations required of the number translator control.

Figure 4C:
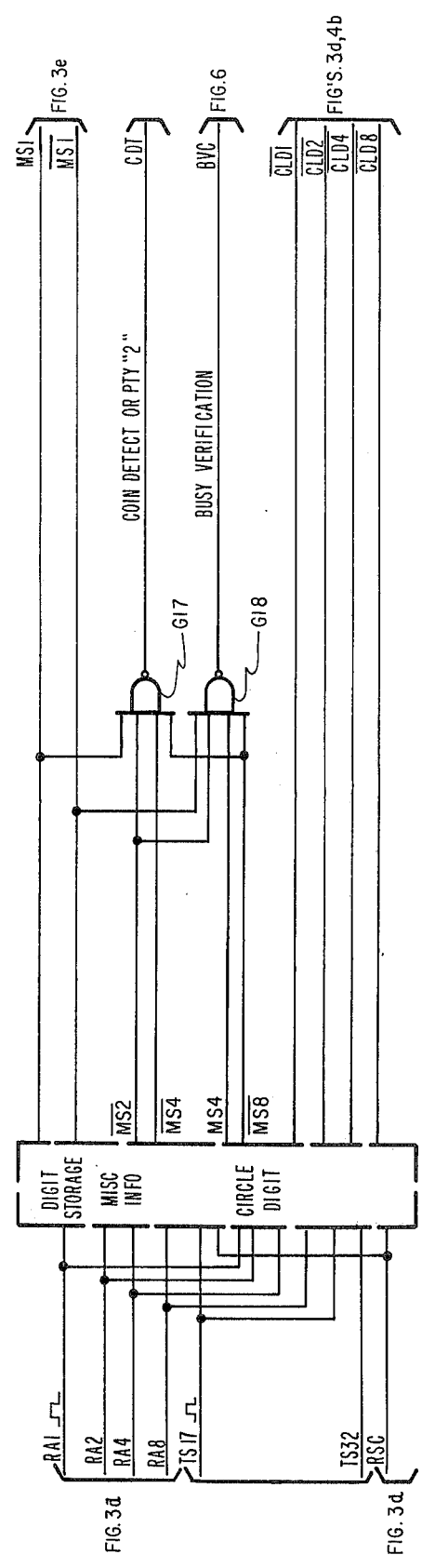
FIGS. 4a through 4c are schematic circuit diagrams of the digit storage.
Figure 4D:
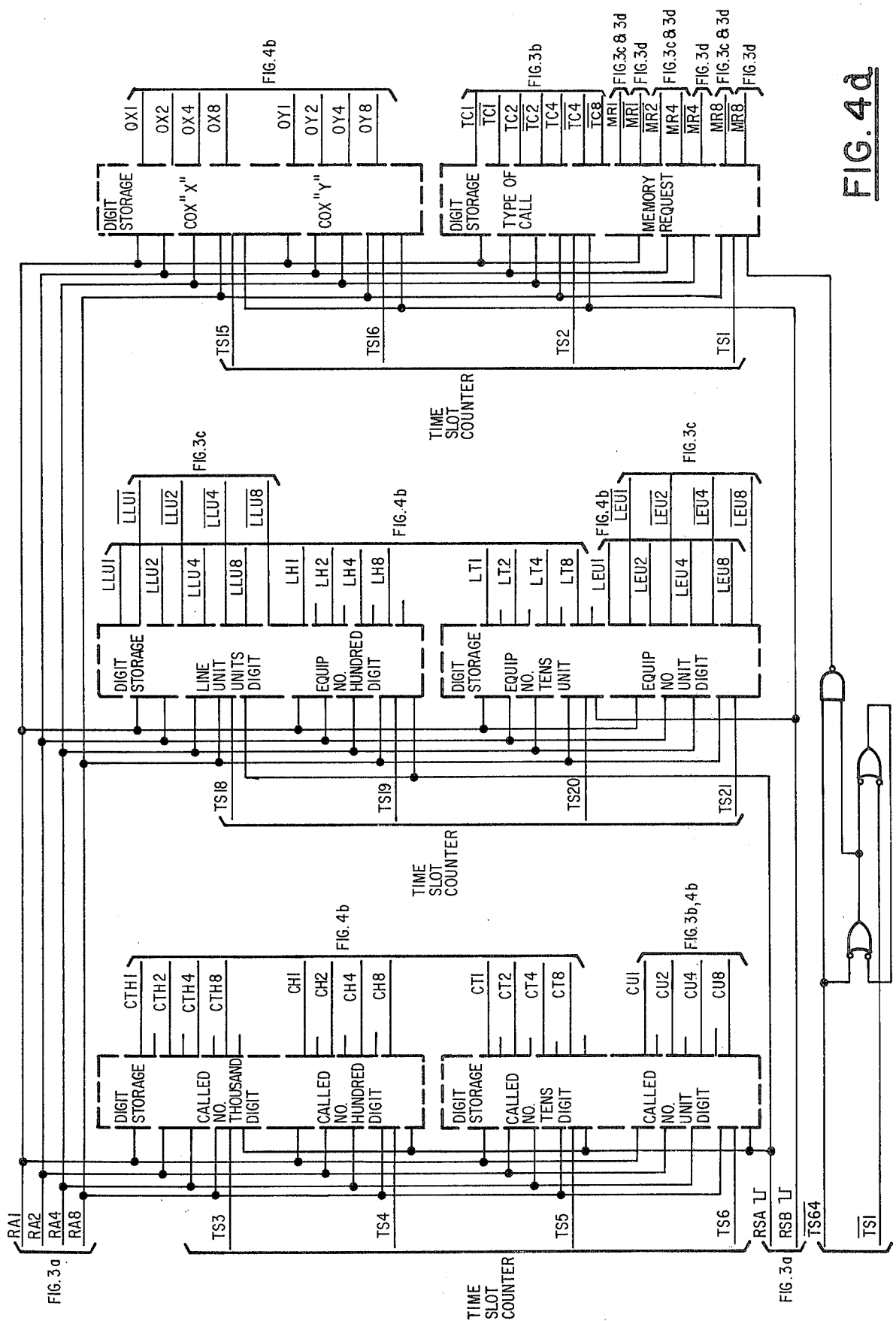

FIGS. 4a and 4c illustrate the digit storage, which provides a plurality of storage locatons for the various data received from the register. The digit storage shown in FIG. 4a stores the memory request digit indicating the type of information to be obtained from the memory, the type of call digit including the office prefix, the four digits of the called number, the line unit units digit, the three digits of the calling equipment number, and the class of service X and Y digits. The digit storage shown in FIG. 4c stores miscellaneous information, such as party line information, and circle digit information. Each of the storage locations in the digit storage is controlled by a respective time sot which is coordinated with the order in which data is received from the register.

At time slot TS1, the control line L1 to the AND gates G1 – G4 will be enabled via gate G15 in FIG. 3a to permit the memory request digit from the register to pass from lines NR1 – NR8 through gates G5 – G8 on lines RA1 – RA8 to the memory. This occurs once the register acquires the translator by applying thereto the signal TRFC via gate G154 to the input of transfer control flip-flop FF5, which receives the clock pulses TCP via gates G56 and G155. The flip-flops FF5 and FF6 provide a delay of 100 to 200 milliseconds before enabling gate G57 to remove ground from the output of gate G58 permitting the line L1 to be enabled and data to be received from the register.

As seen in FIG. 4a, the time slot TS1 stores in the digit storage the memory request from the register, which may take the form of a digit 1, indicating that the service of the number translator is desired for a class of service request and translation of an equipment number. When the memory request is stored in the digit storage, outputs will be received on lines MR1, MR2, MR4, and MR8 through gate G9 in FIG. 3c, providing an output MRQ1 from the gate G9 to the input of gate G10 in FIG. 3a. The output of gate G10 is applied via gates G11 and G12 to one input of AND gate G13.

When the code translator and outgoing trunk marker in the system are free, lead MBY from the translator buffer provide a positive pulse to one input of AND gate G14, the other input of which is enabled at time slot TS2 to set the register bus enable flip-flop FF1, which enables the other input of AND gate G13.

With AND gate G13 enabled, the AND gates G1 – G4 will be enabled from the output of gate G15 via line L1 to permit the data from the register which is received via the translator buffer to be applied sequentially to the digit storages under control of the sequentially generated time slot signals. Thus, the digit 1 stored in the memory request portion of the digit storage, by setting the register bus enable flip-flop FF1 to open the gates G1 – G4 will permit the passing of further information on the leads NR1, NR2, NR4, and NR8 to the digit storage on leads RA1, RA2, RA4, and RA8. The bus enable flip-flop FF1 is reset at time slot TS39 via gate G16, at which time all data should have been received.

The part of the register storage illustrated in FIG. 4c provides for the storage of various miscellaneous information at time slots TS17 and TS32. If the calling line is a one or two party line, the translator will receive during time slot 17 a zero for party one, and a digit 1 for party two on leads RA1, RA2, RA4, and RA8 to the digit storage miscellaneous information section. If the calling line is a multi-party line using circle digit party identification, the circle digit will be received during time slot TS 32 in the circle digit portion of the digit storage.

The AND gates G17 and G18 are also provided having inputs connected to selected outputs of the digit storage locations for identifying and decoding special digits. For example, an output from the gate G17 may indicate a coin detect or the second party of the two party line, while the output from gate G18 may indicate busy verification.

The calling subscribers line unit number (units digit only) and line equipment number (three digits) are received from the translator buffer on leads NR1, NR2, NR4, and NR8 and applied on lines RA1, RA2, RA4, and RA8 to the digit storage during time slots TS18, TS19, TS20, and TS21, respectively, as seen in FIG. 4a, and are stored in the digit storage. At this point, all information required for identification has been received, unless circle digit party identification is used, for which the information will be complete after time slot TS32, as already explained.

Figure 3B:
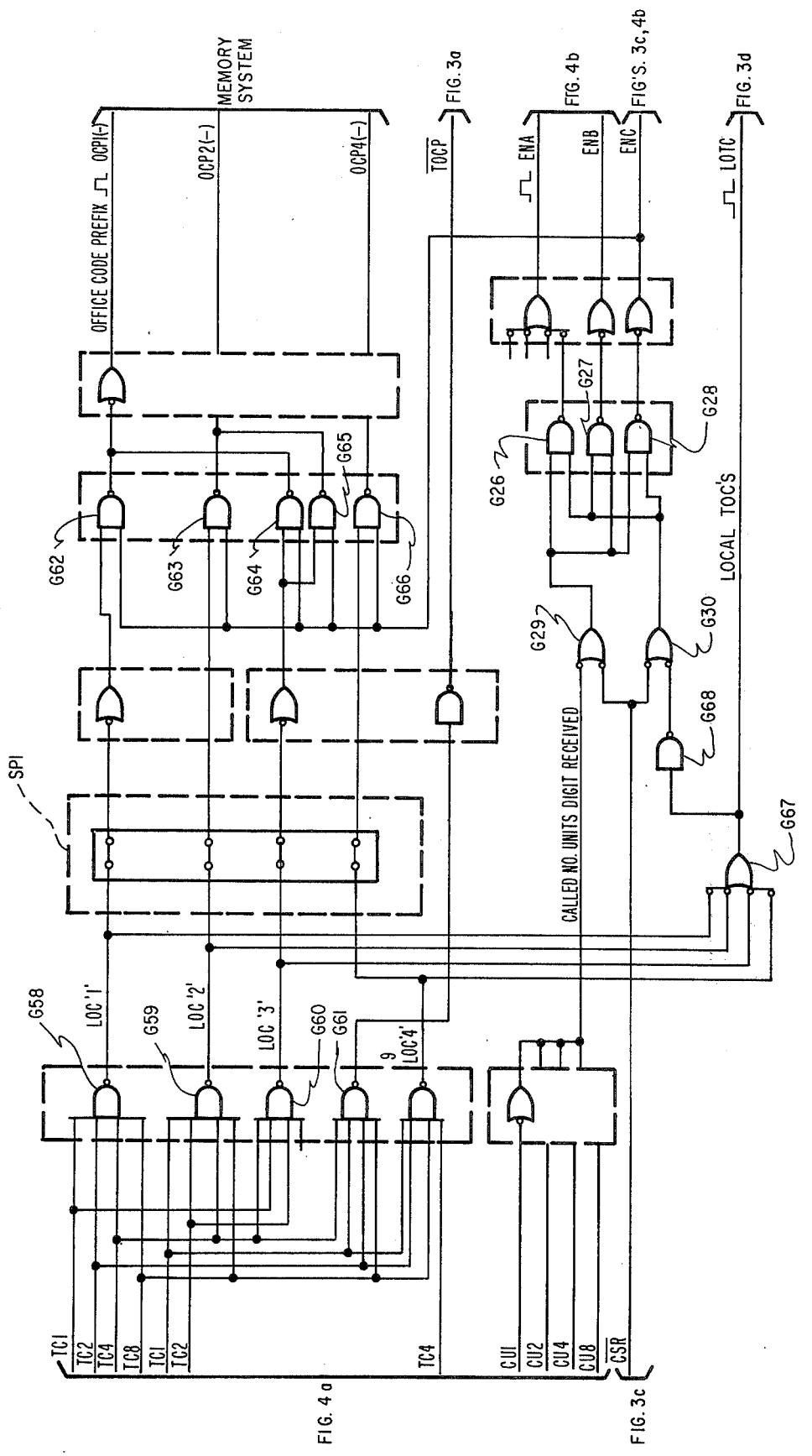
Figure 3C:
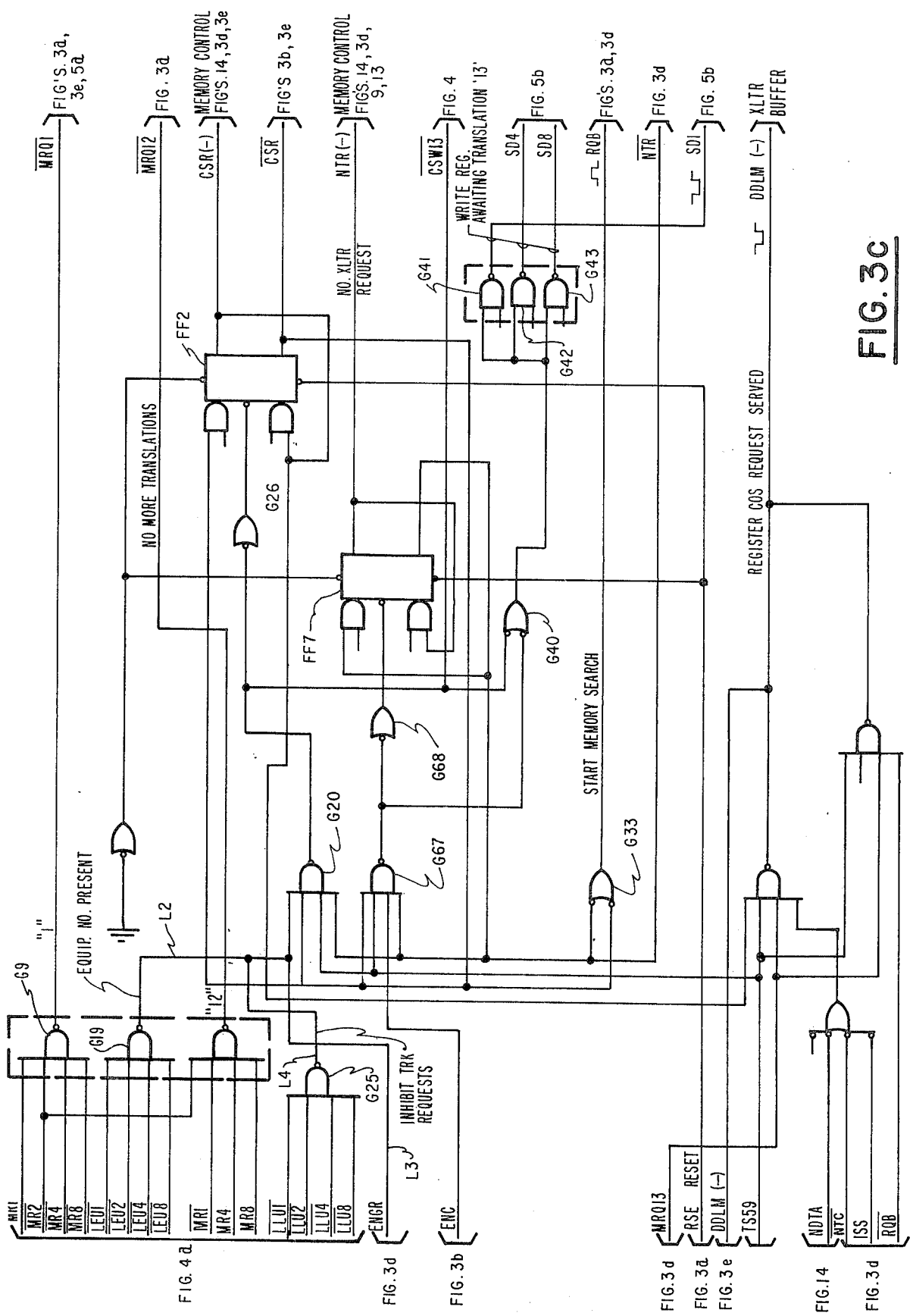
Figure 3E:
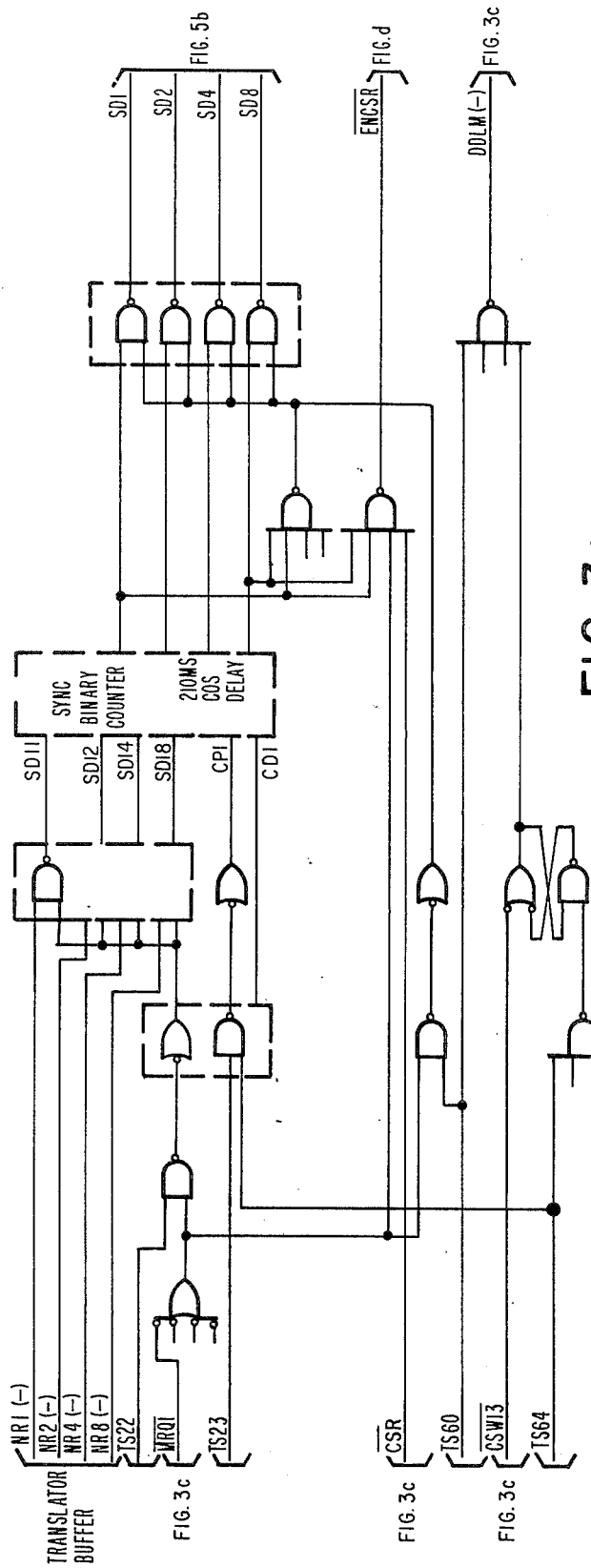

Referring now to FIG. 3c, at time slot TS59, if the equipment number is present in the digit storage, the units digit of the equipment number will have been stored providing outputs LEU1, LEU2, LEU4, and LEU8 at the input of AND gate G19 and line L2 to one input of AND gate G20 will be enabled. In addition, if a party digit has been dialed, the circle digit storage will provide the outputs CLD1, CLD2, CLD4, and CLD8 from FIG. 4c to the input of AND gate G21 in FIG. 3d enabling that gate to the input of AND gate G22, whose other input is derived from gate G23. The output of gate G22 applied through OR gate G24 is provided as the signal ENOR on line L3 to another input of AND gate G20 in FIG. 3c. The third condition for enabling AND gate G20 is that no digits have been dialed by the party. This indication is provided via line L4 from the output of AND gate G25 provided no information is stored in the line unit units digits portion of the digit storage, as indicated on leads LLU1, LLU2, LLU4, and LLU8 to the inputs of AND gate G25.

Figure 4B:
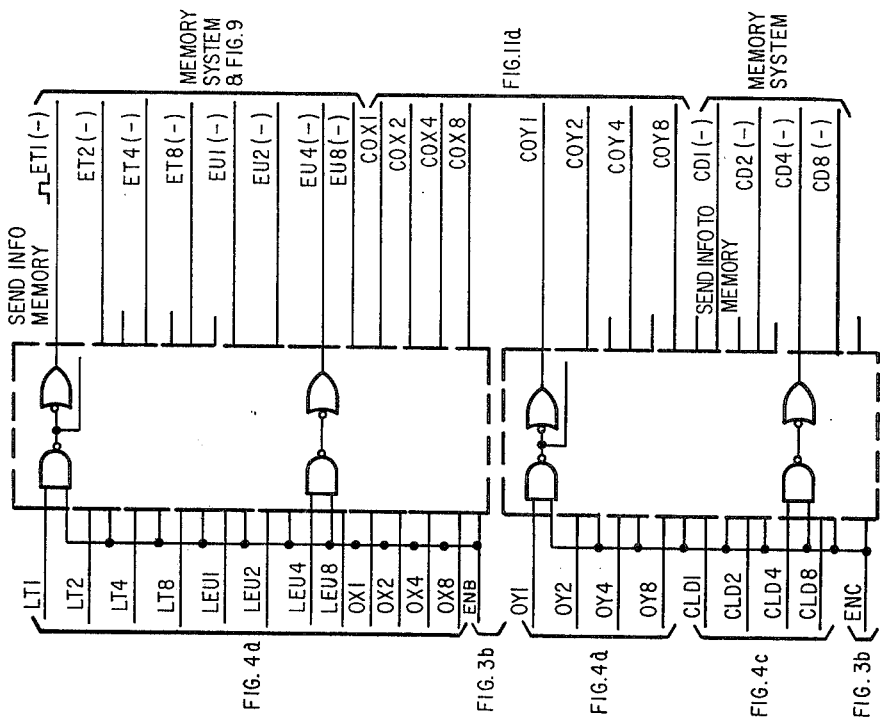
Figure 4B:
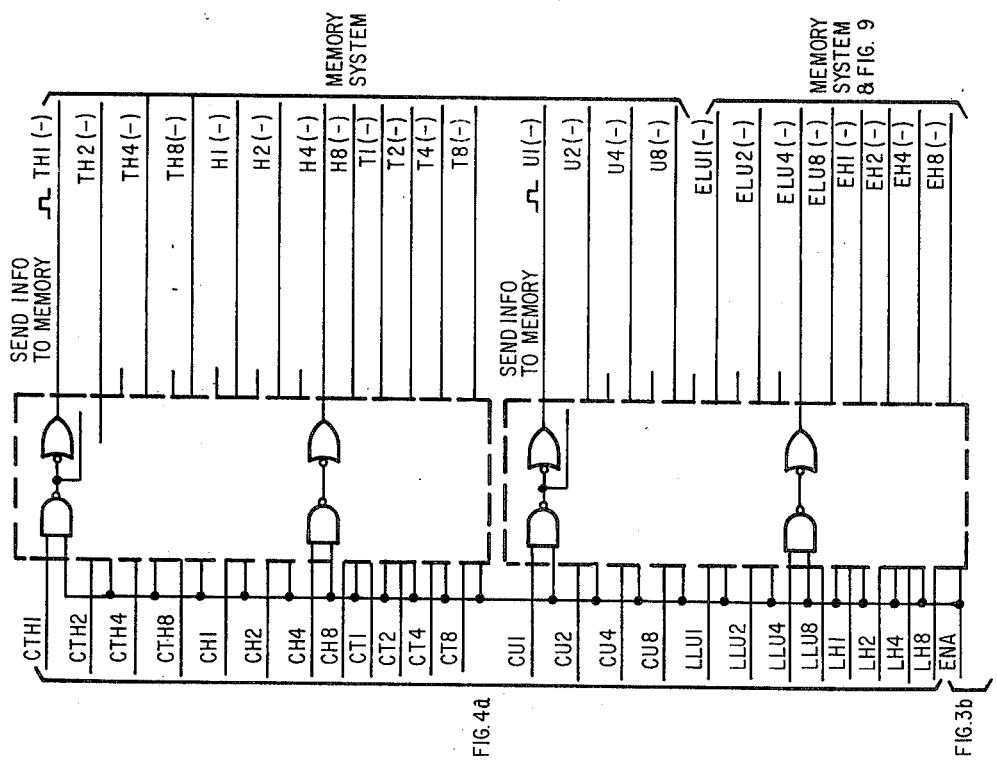

With AND gate G20 enabled, the class of service request flip-flop FF2 is set via gate G26 at time slot TS59. This makes the CSR lead high to the memory control, starting the memory to search for the matching equipment number and party digit. The flip-flop FF2 being set also enables data to the memory by enabling AND gates G26, G27, and G28 via OR gates G29 and G30 in FIG. 3b to generate the enable signals ENA, ENB, and ENC. As seen in FIG. 4b, the signals ENA, ENB, and ENC enable the gates in the digit storage which control the transfer of data from the digit storage to the memory system.

Figure 5B:
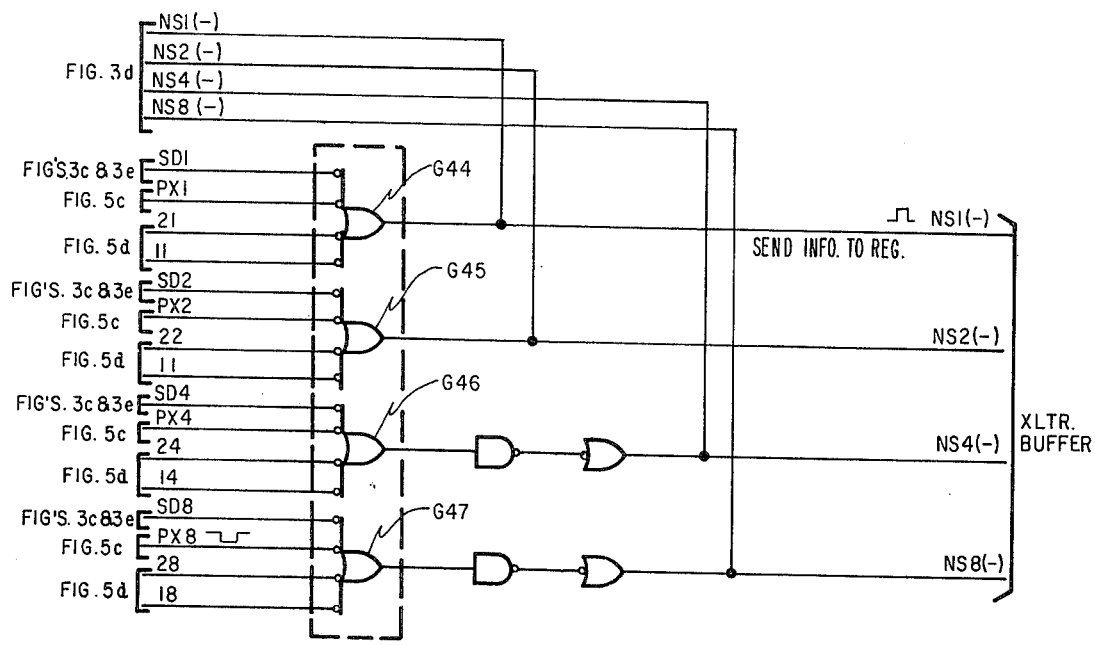
Figure 7:
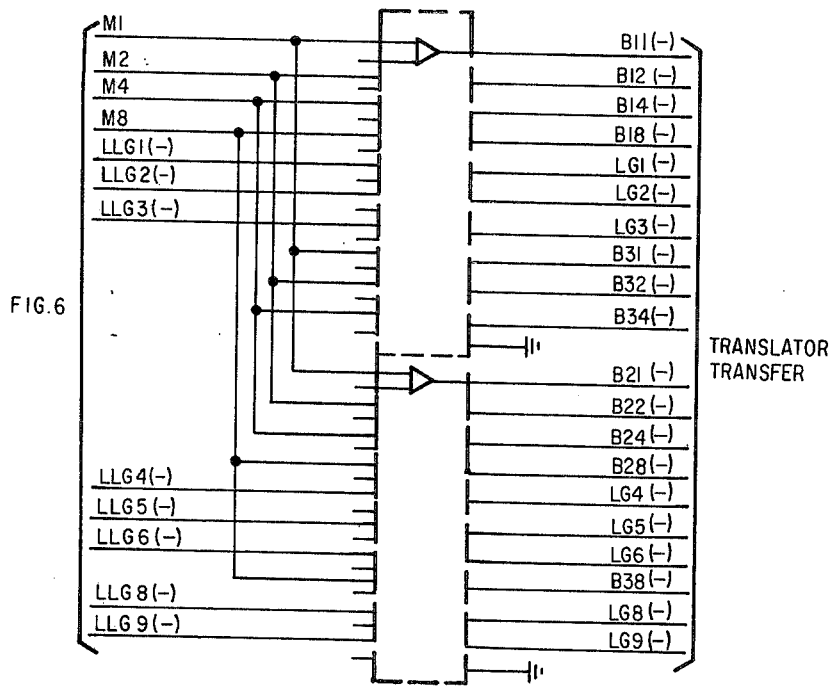
FIG. 7 is a schematic circuit diagram of a portion of the line/trunk marker access circuit.

Upon enabling of the gate G20 in FIG. 3c, gates G41, G42, and G43 are enabled via OR gate G40 to produce the signals SD1, SD4, and SD8, representing the digit 13, which is applied in FIG. 5b through the OR gates G44, G45, G46, and G47 on leads NS1, NS2, NS4, and NS8, respectively, through the translator buffer to the register. This indicates to the register that the information from the register has been received and that the memory is now searching for information requested.

The setting of the flip-flop FF2 in FIG. 3c also clears the memory request digit store after translation is complete. This is accomplished, as seen in FIG. 3d, by applicaton of the signal CSR to one input of AND gate G31, the output of which is applied through OR gate G32 to set the reset control flip-flop FF3 at time slot TS64.

Generation of the signal CRS on setting of the flip-flop FF3 results in enabling of the AND gates G35, G36, and G37 in FIG. 3a to generate the reset signals RSA, RSB, RSC, RSD, and RSE. In addition, the signal CRS produces an output via gates G38 and G39 on lead RLM to the memory system indicating release of the memory.

A signal RQB is also generated from the output of OR gate G33 in FIG. 3c from the CSR output of flip-flop FF2, which signal RQB is applied through OR gate G33 to one input of AND gate G34, the other input of which enables at time slot TS1, which serves to reset the reset control flip-flop FF3.

When the memory scanner stops at the matching equipment number and party digits, all the data from this station stored in the memory is read out in parallel, includng class of service the directory number. The memory control makes the TRC lead in FIG. 3d high when the memory scanner stops, to inform the number translator that translation is complete.

Until translation is completed by the memory and its control, the data buses formed by leads NS1, NS2, NS4, and NS8 to the registers, as seen in FIG. 5b, are inhibited by the corresponding leads NS1, NS2, NS4, and NS8 at the output of gates G48, G49, G50, and G51, respectively, in FIG. 3b. However, when the translation is complete and lead TRC goes high, the translation complete flip-flop FF4 is set in FIG. 3d, providing an output to one input of AND gate G31. When the register having the digit 13 request sends this request back to the number translator to be stored in the memory request portion of the digit storage at time slot TS1, the gate G52 in FIG. 3d will be enabled to another input of AND gate G31, the third input of which is provided with the signal CSR from the output of flip-flop FF2 in FIG. 3c. This enables the gate G31 which performs two basic functions at this time in addition to initiating the resetting of the digit storage as already desired. First of all, it enables the gates G48, G49, G50, and G51 via gates G53 and G54 to permit applicaton of the data output buses extending through the translator buffer to the register.

The second function performed by enabling of AND gate G31 is the setting of the reset control flip-flop FF3 via OR gate G32. This results in generation of the signal CRS, which initiates the release of the number translator, in the manner already described.

Figure 5C:
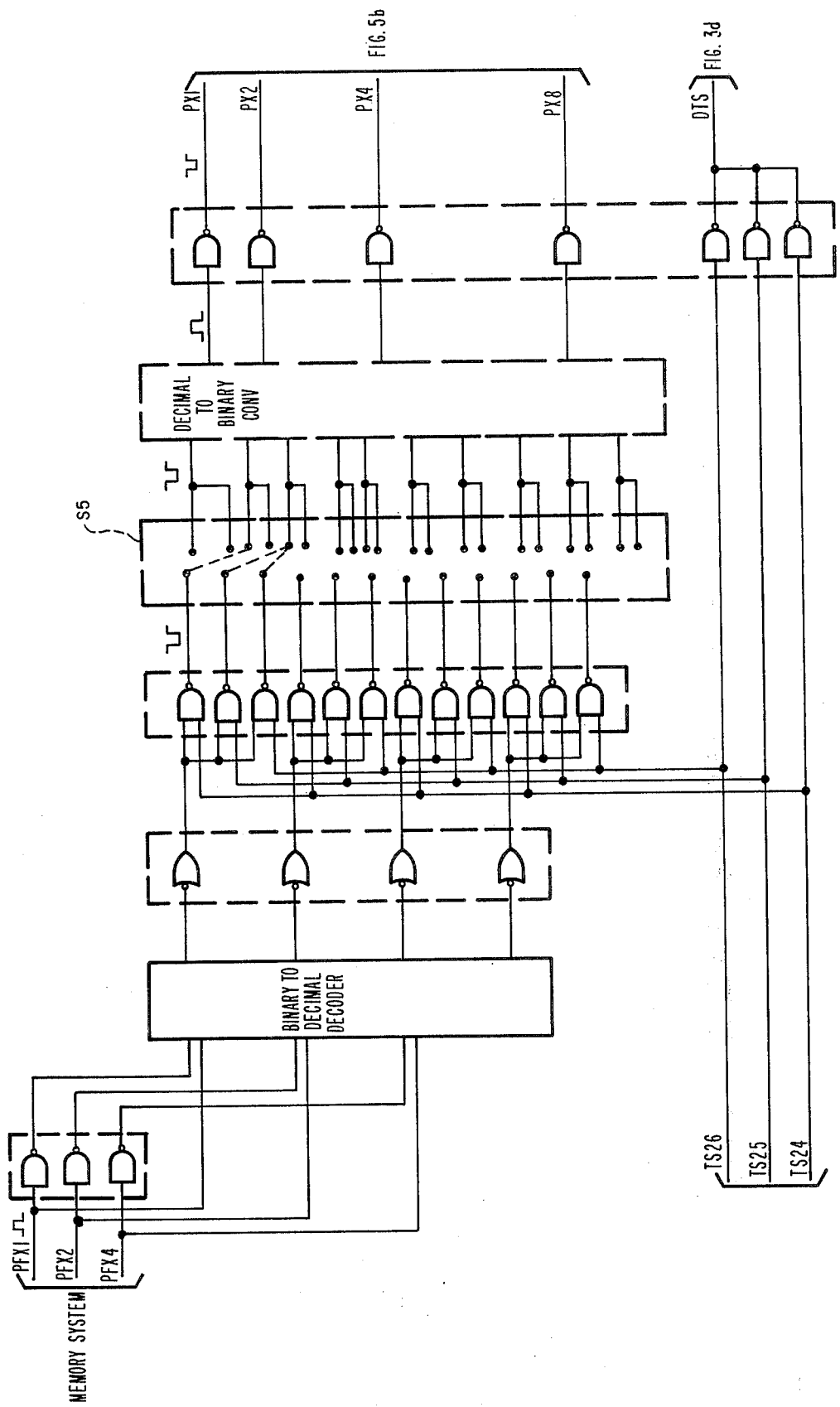

As seen in FIG. 5b, the calling office code prefix digits PX1, PX2, PX4, and PX8 are also supplied to the register at this time. During time slots TS24, TS25, and TS26, as seen in FIG. 5c, the calling office prefix digits in binary form are received from the memory on leads PFX1, PFX2, and PFX4, decoded, passed through a strapping field S5, and converted. The calling office directory number digits received from the memory system are sent to the register during time slots 27, 28, 39, 30, 49, and 50 along with the calling class of service digits X and Y. This information is represented by the signals 11, 12, 14, 18, and 21, 22, 24, 28 in FIG. 5b.

After the translated data has been sent to the register, at time slot TS64, the reset control flip-flop FF3 in FIG. 3d is set as a result of the setting of gate G31 in combination with the receipt of the signal RQB via gate 33, which is received from the output of the OR gate G33 in FIG. 3c. The signal CRS from the output of the reset control flip-flop FF3 is applied to gate G38 in FIG. 3a to enable gates G35, G36, and G37 providing the signals RSA, RSB, and RSC. In addition, the output from gate G38 is applied via gate G39 as a signal RLM to the memory system indicating release of the memory.

The reset leads RSA, RSB, and RSC at ground potential serve to release the number translator digit storage in FIGS. 4a and 4c. Gate G55 is also enabled in FIG. 3a upon generation of the signal CRS to provide the reset signal RSC which resets the class of service request flip-flop FF2 in FIG. 3c. The reset control flip-flop FF3 in FIG. 3d is reset upon receipt of the next time slot signal TS64 as a result of the fact that gate G31 will be disabled since the output at gate G52 will disappear with the clearing of the digit storage. The number translator is then free for handling another request.

DIRECTORY NUMBER TO LINE EQUIPMENT NUMBER TRANSLATION

The second basic function of the number translator is to convert a directory number of a called party as determined by the digits dialed into a line equipment number, ringing code, and called class of service for local terminating traffic.

The translation of a directory number into a line equipment number is performed in an analogous fashion to the translation of an equipment number to a directory number, which has already been described. At time slot TS1, gate G15 in FIG. 3a enables the control line L1 to permit the memory request received on lines NR1, NR2, NR4, and NR8 from the register via the translator buffer to pass AND gates G1, G2, G3, and G4 via gates G5 – G8 to the data lines RA1, RA2, RA4, and RA8, respectively, through the digit storage in FIG. 4a where the memory request digit will be stored in coincidence with the time slot signal TS1. For a directory number translation request, the digit 10 is stored in the memory request portion of the digit store.

When the code translator and outgoing trunk marker are not busy, the MBY lead in FIG. 3a will be high allowing the time slot signal TS2 to enable gate G14, thereby setting the register bus enable flip-flop FF1. The output of flip-flop FF1 enables one input of AND gate G13, the other input of which is enabled from the output of AND gate G14 via OR gate G12. Gate G13 being enabled, the control line L1 will remain enabled via gate G15 for so long as the flip-flop FF1 is set. In this way, the data bus from the register via the translator buffer through the AND gates G1 – G4 will remain open to receive further data which will be stored in the digit store.

At the time the translator is put in service by the translator transfer, the lead TRFC in FIG. 3a is grounded and the timing pulses TCP1 to the input of gate G56 serve to drive the flip-flops FF5 and FF6 which form a transfer control counter which provides a delay of 100 to 200 milliseconds before allowing the translator to receive data, as already described. Setting of the flip-flop FF6 after setting of the flip-flop FF5 will enable the gate G57 to place ground on the NTY lead via gate G58. The lead NTY extends to the translator buffer and marks the translator busy until the request presently being served has been completed.

The office code prefix is received along with the directory number from the register and is stored in synchronism with time slot TS2 in the "type of call" digit storage location. The office code prefix may, for example, be received in the form of digits 1, 2, 3, and 15 for the four local office codes. The prefixes are converted to a three digit binary code in FIG. 3b by receipt of the digits from the digit storage on leads TC1, TC2, TC4, TC1, TC2, TC4, and TC8, which leads are applied to AND gates G58 through G61 which provide the office code prefix signals OCP1, OCP2, and OCP4, via AND gates G62 through G66. These gates are enabled upon receipt of the output ENC from the gate G28. The strapping panel SP1 provides a means for selecting the office codes for the particular offices.

During time slots TS3, TS4, TS5, and TS6, the directory number is received from the register and stored in digit storage, illustrated in FIG. 4a. At this point, all information needed for translation has been received. The register bus enable flip-flop FF1 will be reset at time slot TS39 via gate G16.

When all of the called number digits have been dialed by the calling subscriber and have been transferred from the register into the digit storage, the last digit, i.e., th unit digit, stored at time slot TS6 provides an output from the digit storage on leads CU1, CU2, CU4, and CU8 to one input of the OR gate G29 in FIG. 3b. The office code prefix having been received, enabling one or more of the gates G58 through G61, the OR gate G67 will be enabled and the output thereof is applied through gate G68 to one input of OR gate G30. With the gates G29 and G30 both enabled, the AND gates G26, G27, and G28 will be enabled to provide the enabling signal ENA, ENB, and ENC. As already indicated, the enabling signal ENC will open gates G62 through G66 to permit the office code prefix to be transmitted to the memory. The enabling signals ENA, ENB, and ENC also serve to enable the gates from digit storage to the memory, as seen in FIG. 4b, transferring the directory number stored therein to the memory system for translation.

The enabling signal ENC is also applied to the input of AND gate G67 in FIG. 3c, which gate is enabled at time slot TS59 to set the number translation request flip-flop FF7 via gate G68. Setting of the flip-flop FF7 provides the output signal NTR to the memory control requesting number translation and also serves to enable OR gate G33 to provide an output on the lead RQB, which maintains ground on the lead NTY in FIG. 3a to preserve the busy condition of the translator and prepares for the clearing of the digit storage in FIG. 3d, in the manner previously described.

When the memory scanner stops at the matching directory number, all the data for this station stored in the memory is read out in parallel to the number translator. The memory control then makes the TRC lead in FIG. 3d at the input to gate G69 high when the memory scanner stops to inform the number translator that translation is complete. Until translation is completed by the memory and its control, the data buses (leads NS1, NS2, NS4, and NS8) in FIG. 5b to the translator buffer are inhibited by the corresponding control leads NS1, NS2, NS4, and NS8 connected thereto from the output of gates G48 though G51 in FIG. 3d. When the TRC lead goes high in FIG. 3d, the translation complete flip-flop FF4 is set via AND gate G69 at time slot TS1 since the NTR lead is also enabled. With the flip-flop FF4 set, the AND gate G31 will be enabled enabling gates G48 through G51 via gates G53 and G54 so that the data output buses NS1, NS2, NS4, and NS8 in FIG. 5b are no longer inhibited.

Figure 6:
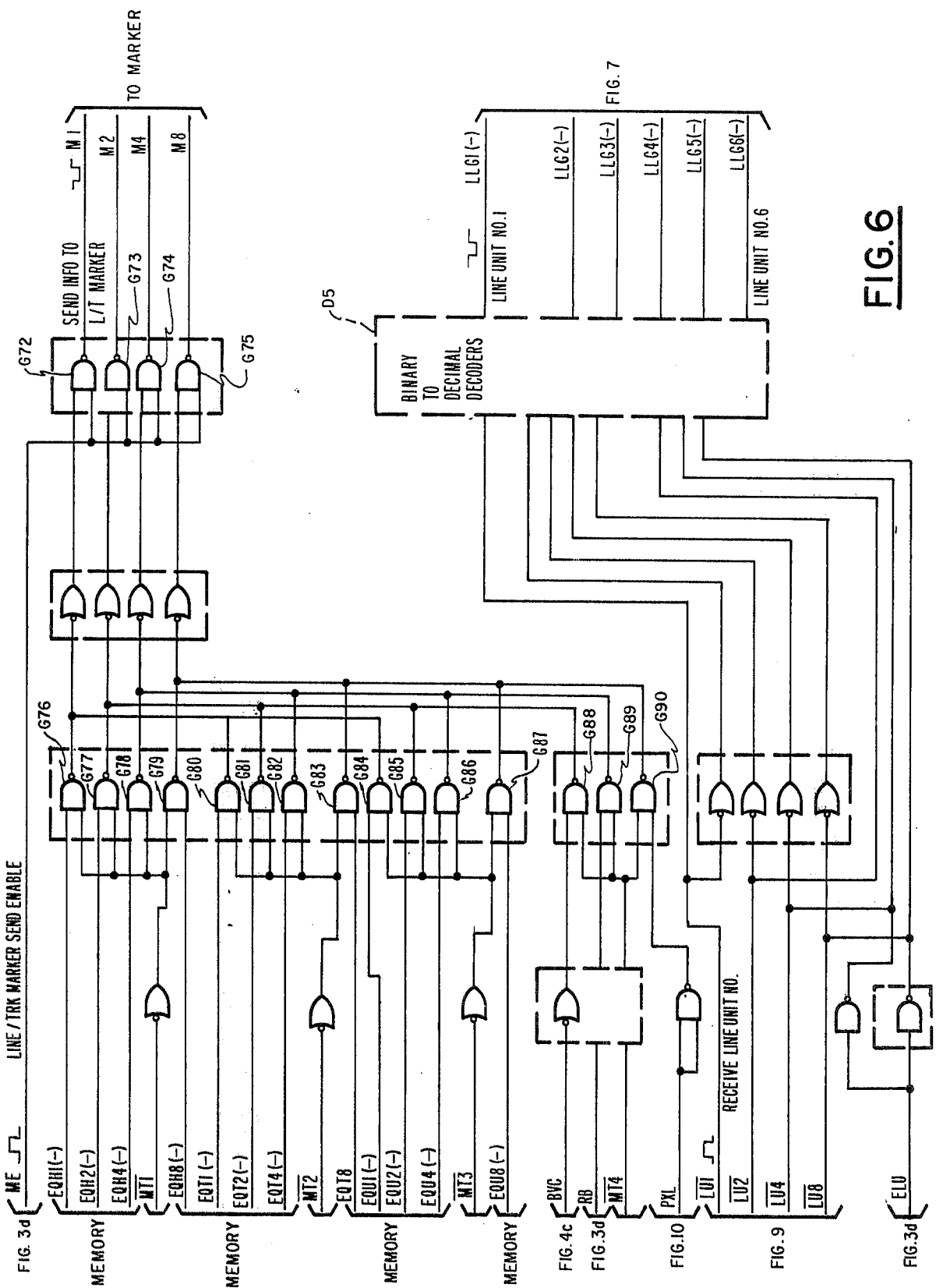
FIG. 6 is a schematic diagram of the line/trunk marker control.

The setting of the flip-flop FF4 in FIG. 3d also initiates the sending of the equipment number read out of the memory to the line/trunk marker. The output from the flip-flop FF4 is applied to AND gate G70 which produces the marker bus enable signal ME via the gate G71. Signal ME is applied in FIG. 6 to a plurality of AND gates G72 – G75 which control transfer of the equipment number from the memory system to the marker. As seen in FIG. 6, the equipment number represented by the signals EQH1, EQH2, EQH4, EQH8, EQT1, EQT2, EQT4, EQT8, EQU1, EQU2, EQU4, EQU8 are applied from the memory to a series of AND gates G76 through G87 which are controlled by the marker timing control signals MT1, MT2, and MT3 generated by the time signal generator. The equipment number is transmitted to the marker as signals M1, M2, M4, and M8.

During the marker time slot MT4, special instructions, such as busy verification, reverse battery, or PBX line in the form of signals BVC, RB, and PXL are applied to the AND gates G88, G89, and G90, respectively, in FIG. 6 along with the marker timing signal MT4. The outputs of these gates are connected in common to the inputs of AND gates G72 through G75 and are controlled by the marker/send enable signal ME.

The line unit number read out of the memory in binary form is provided on leads LU1, LU2, LU4, and LU8 in FIG. 6 to a binary-to-decimal decoder D5 which provides the outputs LLG1, through LLG6 to the marker when the ELU lead received from the output of gate G70 in FIG. 3d goes low at the time of receipt of a translation complete signal TRC from the memory.

Figure 8:
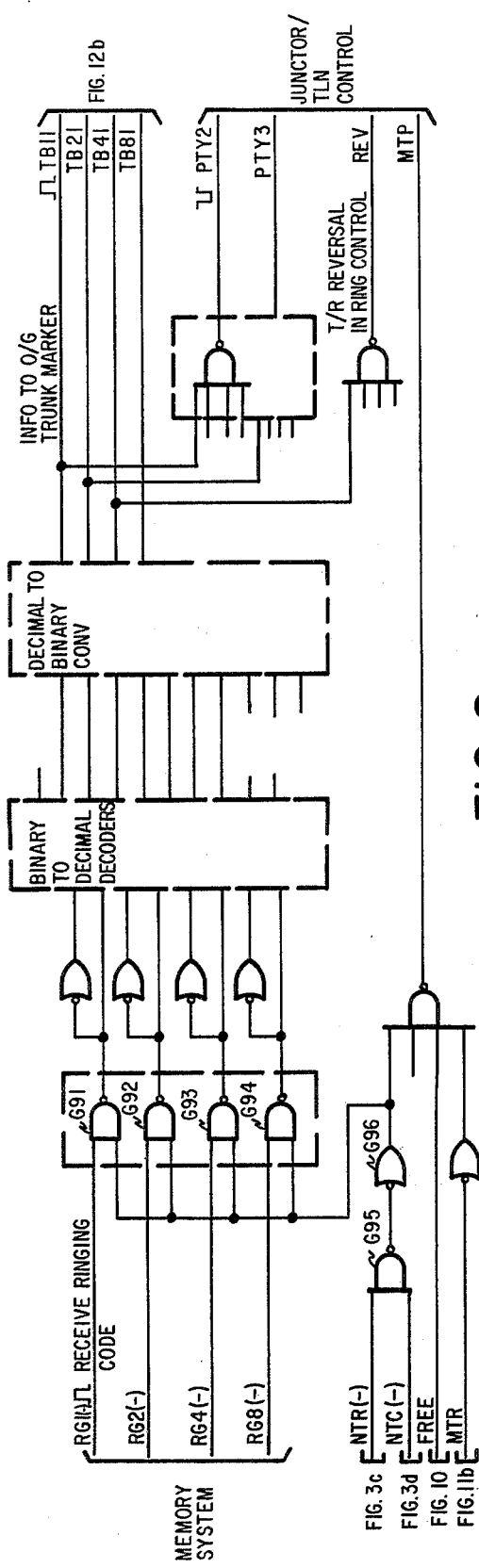
FIG. 8 is a schematic circuit diagram of the ringing code/party line decoder.

The ringing code read out of the memory is decoded in FIG. 8 upon generation of the signal NTR, which is received from FIG. 3c when the flip-flop FF7 is set by the enable signal ENC. The received ringing code provided in binary form on leads RG1, RG2, RG4, and RG8 is applied through AND gates G91 through G94 in response to the output of AND gate G95 being applied through gate G96. Gate G95 is enabled by the output NTC of flip-flop FF4 in FIG. 3d as well as the signal NTR from the output of flip-flop FF7 in FIG. 3c. Ringing code signals are applied from gates G91 through G94, decoded, converted, and sent to the junctor/TLN control on leads PTY2, PTY3, and REV. The ringing code for private lines or the first party of party lines is not sent as this code is rung if no other is sent. However, the leads PTY2 or PTY3 select the parties two or three separately, and when both are low, this indicates selection of party four. When the REV lead is low, parties five through eight are selected according to the signals on PTY2 and PTY3. The ringing code is also provided for the outgoing trunk marker (for reverting calls) via the leads TB11, TB21, TB41, and TB81.

At this point, all of the data has been forwarded from the translator. The enabling of gate G31 in FIG. 3d results in the setting of the reset control flip-flop FF3 via gate G32 to provide the reset signal CRS. Thus, in the manner already described, the reset signals RSA, RSB, RSC, RSD, and RSE will be generated in FIG. 3a providing for a resetting of the various control flip-flops and the digit storage as part of the general release of the number translator making the translator free for handling another request.

REVERTING CALL DETECTION

Figure 9:
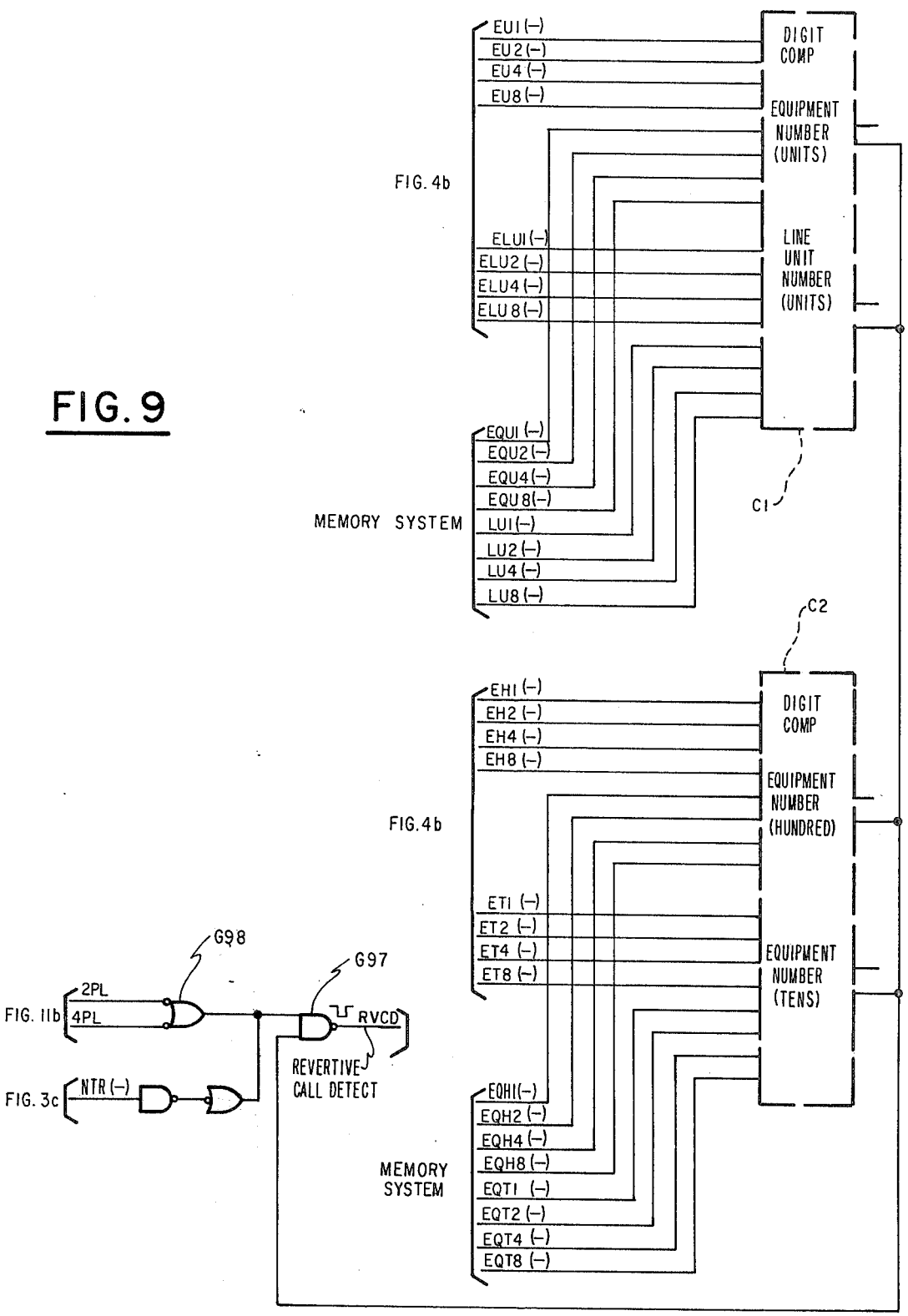
FIG. 9 is a schematic circuit diagram of the reverted call detection circuit.

If the equipment number of both the calling line and the called line are the same, the call is to another party on the same line. The comparison of the equipment numbers is performed by the circuit illustrated in FIG. 9, and a comparison is also made to determine that both calling and called numbers are party line numbers. Thus, the comparator C1 in FIG. 9 compares the units digit of the equipment number of the called party as received from the digit store (FIG. 4b) with the units digit of the equipment number of the calling party as received from the memory. In addition, the comparator C1 also compares the units digit of the line unit number to the respective parties. The comparator C2 compares the hundreds digit of the equipment number and the tens digit of the equipment number of the respective parties and the outputs of the comparators C1 and C2 are ANDED and connected to one input of an AND gate G97.

If the calling line is a two party or four party line, the OR gate G98 will be enabled to the other input of gate G97 which will then generate the revertive call detect signal RVCD to route the call to a reverting call trunk.

ROUTING TO SPECIAL TRUNKS

The number translator in accordance with the present invention provides for routing of various types of calls in accordance with the class of service assigned to the calling and called directory number of the parties.

In the case of the called directory number, the special routing may relate, for example, to direct inward dialing (dial pulse sending), direct inward dialing (multifrequency sending), intercept on a restricted call, intercept with routing to selected recordings and special terminating calls.

In connection with the calling directory number, the class of service may indicate special routing to intercept a restricted call, intercept to the operator, intercept to a selected recording and special routing on an originating call.

In addition, reverting calls and calls from a pay station when no coin is deposited on a local call are also routed to special trunks. Further, additional routes with route translation similar to the code translator are provided, to add or skip digits, determine the outpulsing mode, and so forth, so that the call may be switched to another office or to any desired termination.

Figure 10:
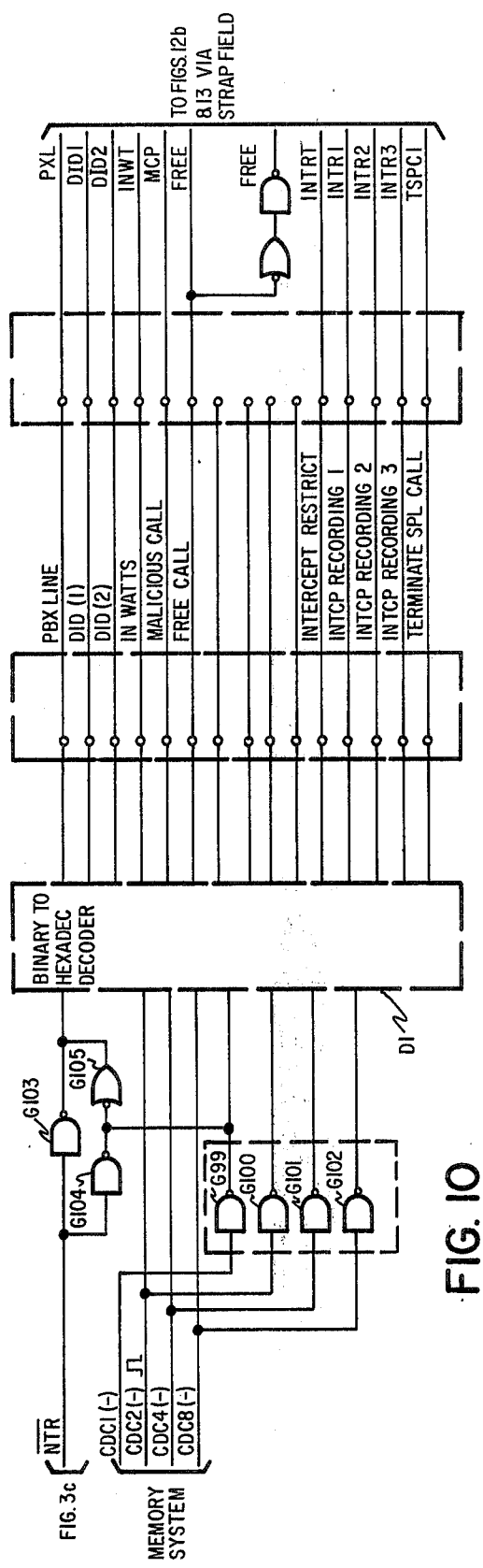
FIG. 10 is a schematic circuit diagram of the called class of service decoder.

The called number class of service digit is read from the memory on lines CDC1, CDC2, CDC4, and CDC8 in FIG. 10 and are applied directly and through gates G99 - G102 to a binary-to-hexadecimal decoder D1, which decodes the digit. The decoder D1 is enabled by the signal NTR via gates G103, G104, and G105, the signal NTR being received from the output of flip-flop FF7 in FIG. 3c upon receipt of the enable signal ENC.

The outputs from the called class of service decoder of FIG. 10 are applied through a selective strapping field (not shown) and result in the signals T0 – T3 and U1 – U0, respectively, applied to the decimal-to-binary converter C1 in FIG. 12b. The route selection signals are converted to binary form in the converter C1 and applied to AND gates G106 through G113 where the T0 – T3 leads are connected to the output leads B11, B21, B41, and B81 when the timing signal TGT is generated at time slot TS20 and TS53 (FIG. 12a), while the converted route selection signals U1 through U0 are applied to the same output lines B11, B21, B41, and B81 when the timing signal TGU is generated during time slots TS21 and TS54 (FIG. 12a). At time slot TS55 the trunk marker information on leads TB11, TB21, TB41, and TB81 is similarly applied to the output lines via gates G114 through G117 at time slot TS55, in the manner already described in connection with FIG. 8.

Figure 11A:
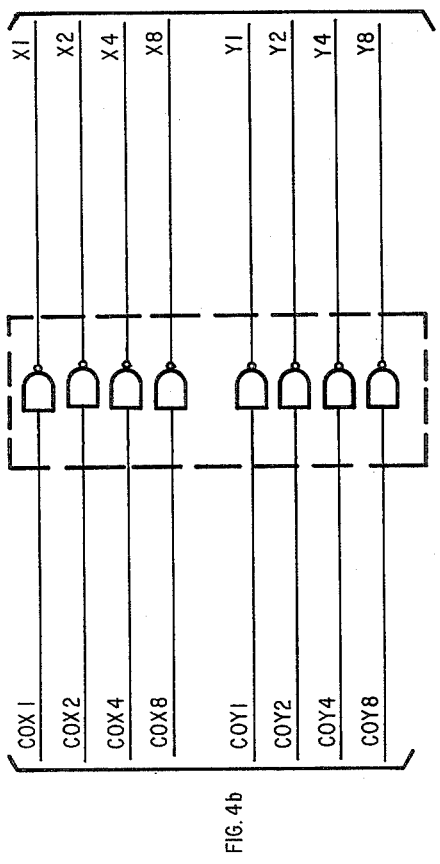
FIGS. 11a and 11b are schematic circuit diagrams of the calling class of service decoder.
Figure 11B:
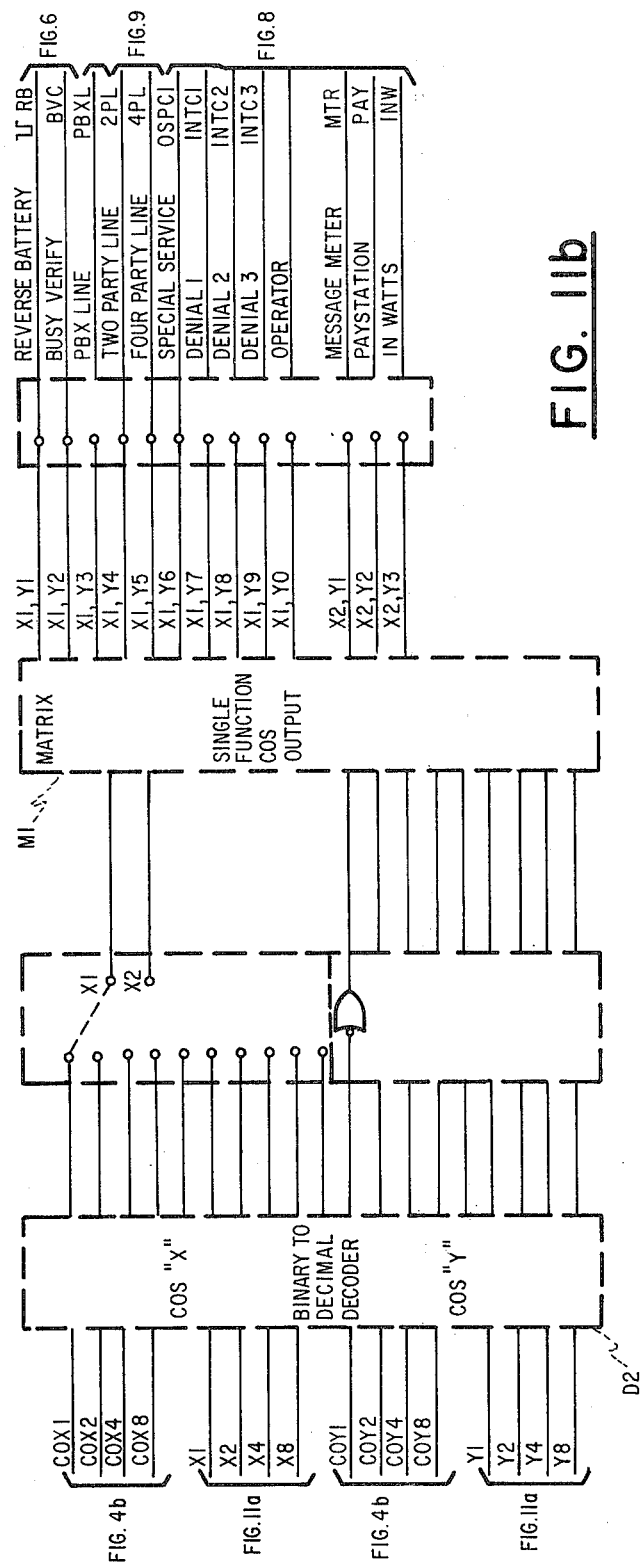

The calling number class of service digits X and Y stored in the digit store (FIG. 4a) are provided on leads OX1 – OX8 and OY1 – OY8 to FIG. 4b where they are transmitted on leads COX1 – COX8 and COY1 – COY8 to FIG. 11a where they are passed through suitable gates to become signals X1 – X8 and Y1 – Y8. These signals are supplied to FIG. 11b along with the signals COX1 – COX8 and COY1 – COY8 from FIG. 4b to the input of a binary-to-decimal decoder D2, which decodes the class of service digits. The decoded X digit is then passed through a strapping field and the Y digit is passed through suitable gating to a matrix M1, providing at its output the respective class of service signals designated by the combined X and Y class of service digits. These output signals are used within the number translator for controlling various functions and to provide for special routing.

ROUTE BUSY TEST

When the number translator selects a route, placing ground on one of the leads TO1 TO2, or TO3 or if one of the special route selection leads RT10 – RT15 in FIG. 13 are marked, at time slot TS2 and AND gate G118 will be enabled, providing the memory scanning is complete as indicated by the NTC lead to the gate G118 being high. This results in the setting of the route output detect flip-flop FF7. When the flip-flop FF7 is set, at time slot TS36, the AND gate G119 will be enabled providing the enable trunk signals ENT and ENT1 via gates G120 and G121.

The enable signals ENT and ENT1 are applied in control of a plurality of AND gates G122 through G137 in FIG. 12a. To these AND gates are applied the signals BT1 – BT8, BU1 – BU8, and the trunk group tens and units digits stored in the digit storage DS1. The trunk group tens and units digits represented by the signal on leads TB12, TB22, TB42, and TB82 in binary form are derived from FIG. 12c from the signals D1 – D15, generated from the called and calling class of service signals derived from FIGS. 10 and 11b via suitable strapping fields (not shown). The timing signals TGT for the tens digits and TGU for the units digit permit the storing in the digit storage DS1 the digits for the called and calling parties at respective time slots so that the digit storage DS1 is used on a time-shared basis.

When the enable signals ENT and ENT1 are generated and applied to the gates G122 – G137 in FIG. 12a, the trunk group number tens and units digits are sent to the ATB (all trunks busy interrogator), which makes a test to determine if there is an idle trunk in the group.

If the NATV lead in FIG. 13 goes high, indicating that a trunk is available, AND gate G139 will be enabled since the route output detect flip-flop FF7 is set, setting the trunk group available flip-flop FF8, thereby enabling AND gate G140 to generate the signals TAV1 and TAV2, indicating that a trunk is available.

If no trunk had been available, the signal NATV would not have been received and the flip-flop FF8 would not have been set. At time slot TS39, the AND gate G141 would have been enabled in view of the fact that flip-flop FF7 is set thereby setting the ATB detect flip-flop FF9 and enabling the gates G142 and G143 to generate the signals OMB2, OMB4, and OMB8 indicating that all trunks are busy.

The ATB detect flip-flop FF9 in FIG. 13 will also be set in the absence of a trunk available signal NTAV if a memory fault occurs. In this case, the signal EBY is applied directly to flip-flop FF9 to set the flip-flop and generate the signals OMB2, OMB4, and OMB8 via gates G142 – G144. The signals OMB2, OMB4, and OMB8 represent the digit 14 which is sent to the outgoing trunk marker during time slot TS55 when the AND gates G142 – G144 are enabled. This provides an indication of "equipment busy" to the marker and disables the TAV1 and TAV2 leads.

A flip-flop FF10, also provided in FIG. 13, is responsive to the signal MBY received from the register at the time of acquisition of the translator and the time slot signal TS1 applied via AND gate G145 to prevent operation of the gate G140 when a test of the trunk groups is not being carried out.

If a digit 2 is read out of the route matrix during time slot TS58, it represents a request for a sender to be associated with the register, and lead FRQ in FIG. 13 will be grounded setting the sender request flip-flop FF11. However, if no sender is available, the no-sender-available flip-flop FF12 will be set at time slot TS31 via AND gate G146 in response to the signals RA1 – RA8 from the register. These two conditions will enable the gate G147 to ground the TAV2 lead preventing enabling of the register bus for sending the required information.

TIME-OUT AND FAULT CONTROL

When the number translator fails to perform its work and release within a 400 to 500 millisecond period, the time-out counter CR2 in FIG. 14 will reach a count of four as a result of application thereto of timing pulses on lead TCP from the counter CR1. This results in enabling of the AND gate G147, placing ground on the lead FLT8 indicating that the translator has timed out. This is forwarded to the fault counter as one step of the fault-counting procedure, to be described in greater detail hereinafter. Also, the output of gate G147 is applied via gates G148, G149, and G150 to cause the FTR lead to go high to request a fault print out. At the same time, the EBY lead goes low as a result of enabling of AND gate G151 to originate an equipment busy signal to the calling party.

When the time-out counter reaches a count of ten, gate G152 is enabled generating the signal TRR to FIG. 3d causing the number translator to release. The signal TRR in FIG. 3d causes the setting of flip-flops FF12 and FF13 to generate the end of sending signal EOS, which is sent to the register via the translator buffer.

At the time of release of the translator, the fault counter completes its stepping and when the fault recorder has completed its print out, the FRS lead in FIG. 14 is grounded to reset the time-out counter CR2.

When incomplete data is provided in the memory system, the system will send a signal INCD to the translator, which signal is received in FIG. 14 at the input to the binary counter CR3. When the binary counter CR3 reaches a count of fifteen indicating that there have been fifteen consecutive incomplete data indications from the memory, a signal TRF is forwarded to the register via the translator buffer indicating malfunction of the translator and requesting transfer to an auxiliary translator, if present in the system. In the same way, after ten consecutive memory faults indicated in the fault counter CR3 in FIG. 14, resulting from receipt of the memory false signals MFLT from the memory system via gate G148, gate G153 will be enabled to generate the signal TRF to the register via the translator buffer.

While the present invention has been described in conjunction with a particular automatic telephone system, it should be apparent that other systems can be equally served by the number translator arrangement described herein. Thus, it is to be clearly understood that this description is to be taken only by way of example and not as a limitation on the scope of the invention.

What is claimed is:

1. In a telephone system including a plurality of subscriber stations identified by an equipment number and a directory number, a plurality of groups of outgoing trunk circuits, and common control means including a plurality of registers for connecting subscriber stations together or to a trunk circuit in response to a signal designating the directory number of a called station received from a calling station, a number translator comprising a memory system including memory means for storing in respective memory locations the equipment and directory numbers and other data relating to each of said plurality of subscriber stations and comparator means for comparing a directory number or equipment number with the data stored in said memory means so as to address a specific memory location; register digit storage means including a plurality of storage locations for storing equipment and directory number data, type of call data, and a translator memory request received from a register; means for sequentially scanning the storage locations of said register digit storage means to read out data stored therein; translator control means responsive to said memory request stored in said register digit storage means read out by said scanning means for transferring said number data therein to said comparator means; and register sender control means responsive to said translator control means for transferring data from a specific memory location addressed by said comparator means to a register.

2. A number translator as defined in claim 1 wherein said translator control means includes first means responsive to a translator request signal from a register for connecting said register digit storage means to said register and second means responsive to storage of a memory request in said register digit storage means for maintaining said connection of said register digit storage means to said register.

3. A number translator as defined in claim 2 wherein said first means in said transfer control means includes means for generating a translator busy indication for preventing further acquisition of the translator by another register.

4. A number translator as defined in claim 2 wherein said transfer control means includes third means for decoding office code prefix data stored as type of call data in said register digit storage means, and fourth means responsive to storage of an equipment number or a directory number in said register digit storage means for transferring said data including said decoded office code prefix data to said comparator means in memory system.

5. A number translator as defined in claim 4 wherein said fourth means in said transfer control means includes class-of-service request means responive to storage of an equipment number and no directory number as well as receipt from said register of party line data for generating a class-of-service request signal, and fifth means responsive to said class-of-service request signal for transferring the data stored in said register digit storage means to said memory system.

6. A number translator as defined in claim 4 wherein said fourth means in said transfer control means includes number translator request means responsive to storage of office code prefix data as type of call data in said register digit storage means in the absence of a class-of-service request signal for generating a number translator request signal, and fifth means responsive to said number translator request signal for decoding class-of-service data received from said memory means.

7. A number translator as defined in claim 6 further including route translation means responsive to said class-of-service data decoded by said fifth means for selecting an available outgoing trunk circuit group, and wherein said common control means further includes an outgoing trunk marker responsive to the output of said route translation means for marking an available trunk circuit within the designated group.

8. A number translator as defined in claim 7, further including outgoing trunk marker control means responsive to an availability signal from said common control indicating a trunk group is available for transmitting the selected trunk group identification to said register.

9. A number translator as defined in claim 8 wherein said outgoing trunk marker control means includes sixth means for generating a trunk busy signal if said availability signal is not received a predetermined time after generation of said number translator request signal.

10. A number translator as defined in claim 9 wherein said outgoing trunk marker control means includes seventh means responsive to said class-of-service data decoded by said fifth means for providing a first signal indicating the need for a sender to be associated with said register, eighth means for generating a second signal in response to signals from said common control indicating that no sender is available, and ninth means for inhibiting transmission of said selected trunk group identification to said register upon receipt of said first and second signals.

11. A number translator as defined in claim 1, further including called party class-of-service decoder means for decoding class-of-service data derived from said memory means relating to a called subscriber station.

12. A number translator as defined in claim 1, further including calling party class-of-service decoder means for decoding class-of-service data derived from said memory means relating to a calling subscriber station.

* * * * *